United States Patent
Hu et al.

(10) Patent No.: US 12,289,261 B2
(45) Date of Patent: Apr. 29, 2025

(54) OPTIMIZATION OF DISTRIBUTED-TONE RESOURCE UNIT AND MULTI-RESOURCE UNIT DESIGNS FOR TRANSMISSION IN 6GHz LPI SYSTEM

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 182 days.

(21) Appl. No.: 17/726,824

(22) Filed: Apr. 22, 2022

(65) Prior Publication Data
US 2022/0345263 A1 Oct. 27, 2022

Related U.S. Application Data

(60) Provisional application No. 63/186,850, filed on May 11, 2021, provisional application No. 63/179,600, filed on Apr. 26, 2021.

(51) Int. Cl.
*H04L 5/00* (2006.01)
(52) U.S. Cl.
CPC .......... *H04L 5/0046* (2013.01); *H04L 5/0007* (2013.01); *H04L 5/0048* (2013.01)
(58) Field of Classification Search
None
See application file for complete search history.

(56) References Cited

U.S. PATENT DOCUMENTS

| | | | |
|---|---|---|---|
| 2018/0183905 A1* | 6/2018 | Azizi | H04L 27/02 |
| 2020/0007265 A1 | 1/2020 | Min et al. | |
| 2020/0008185 A1 | 1/2020 | Chen et al. | |
| 2020/0014509 A1 | 1/2020 | Asterjadhi et al. | |
| 2020/0137836 A1* | 4/2020 | Chen | H04W 72/0473 |
| 2021/0067283 A1 | 3/2021 | Hart et al. | |

(Continued)

FOREIGN PATENT DOCUMENTS

| | | |
|---|---|---|
| CN | 114071469 A | 7/2020 |
| CN | 114449627 A | 10/2020 |
| EP | 3945693 A1 | 2/2022 |

(Continued)

OTHER PUBLICATIONS

European Patent Office, Extended European Search Report for European Patent Application No. 22169819.4, Sep. 14, 2022.

(Continued)

*Primary Examiner* — Lonnie V Sweet
(74) *Attorney, Agent, or Firm* — Andy M. Han; Han IP PLLC

(57) ABSTRACT

Various schemes pertaining to optimization of distributed-tone resource unit (dRU) and distributed-tone multi-resource unit (dMRU) designs for transmission in a 6 GHz low-power indoor (LPI) system are described. An apparatus distributes a plurality of subcarriers of a resource unit (RU) to generate a dRU or a distributed-tone multi-RU (dMRU) on an 80 MHz frequency segment or subblock. The apparatus then communicates with a communication entity using the dRU or the dMRU.

19 Claims, 68 Drawing Sheets

(56) References Cited

U.S. PATENT DOCUMENTS

2021/0288768 A1* 9/2021 Yang .................... H04L 5/0044

FOREIGN PATENT DOCUMENTS

| EP | 3993303 A1 | 5/2022 |
| EP | 4047856 A1 | 8/2022 |
| WO | WO 2016137144 A1 | 9/2016 |

OTHER PUBLICATIONS

Taiwan Intellectual Property Office, Office Action for Taiwan Patent Application No. 111115802, Nov. 10, 2022.

Edward Au (Huawei), "Specification Framework for TGbe", vol. 802.11 EHT; 802.11be, No. 14, (Sep. 5, 2020), pp. 1-58, IEEE Draft; 11-19-1262-14-00BE-SPecification-Framework-For-TGbe,IEEE-SA Mentor, Piscataway, NJ, USA; published on Sep. 5, 2020; https://mentor.ieee.org/802.11/dcn/19/11-19-1262-14-00be-specification-framework-fortgbe.docx.

China National Intellectual Property Administration, First Office Action in China Patent Application No. 202210436745.7, Jan. 26, 2025, 10 Pages.

\* cited by examiner

FIG. 2

| 26-TONE | 1 | 2 | 3 | 4 | | 6 | 7 | 8 | 9 | 10 | 11 | | 13 | 14 | 15 | 16 | 17 | 18 | | 20 | 21 | 22 | 23 | | 25 | 26 | 27 | 28 | 29 | 30 | 31 | 32 | | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|
| 52-TONE | 1 | | 2 | | 3 | | 4 | | 5 | | 6 | | 7 | | 8 | | 9 | | 10 | | 11 | | 12 | | 13 | | 14 | | 15 | | 16 | | | |
| 106-TONE | 1 | | | 2 | | | 3 | | | 4 | | | 5 | | | 6 | | | 7 | | | 8 | | | |
| 242-TONE | 1 | | | 2 | | | 3 | | | 4 | | | |
| 484-TONE | 1 | | | 2 | | | |
| 996-TONE | 1 | | | |

| dRU size | RUstart (r) | {I(l)} |
|---|---|---|
| 26 | {0,13,26,3,16,29,6,19,32,9,22,35,12,25,2,15,28, 5,18,31,8,21,34,11,24,1,14,27,4,17,30,7,20,33,10,23} | {0} |
| 52 | {0,3,6,19,9,12,2,5,18,8,11,1,4,17,20,10} | {0,13} for dRU1,4,5,7,9,10,11,12,14,15,16; {0,23} for dRU2,3,6,8,13 |
| 106 | {0,6,9,2,8,1,4,10} | {0,3,13,26} for dRU1,3,4<br>{0,13,23,26} for dRU2,7<br>{0,10,13,23} for dRU5,6,8 |
| 242 | {0,2,1,4} | {0,3,6,13,16,19,26,29,32} for dRU1<br>{0,3,7,10,13,20,23,26,33} for dRU2<br>{0,7,10,13,17,20,23,30,33} for dRU3<br>{0,3,6,13,16,19,23,26,29} for dRU4 |
| 484 | {0,1} | {0,2,3,5,6,9,12,13,15,16,19,22,25,26,28,29, 32,35} for dRU1<br>{0,3,6,7,9,10,13,16,17,19,20,22,23,26,29,30, 32,33} for dRU2 |

(A) dRU52

(B) dRU106

(C) dRU242

FIG. 3B

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-500:36:-68, 68:36:500] | dRU2 [-487:36:-55, 55:36:487] | dRU3 [-474:36:-42, 42:36:474] | dRU4 [-497:36:-65, 65:36:497] | dRU5 [-484:36:-52, 52:36:484] |
| | dRU6 [-471:36:-39, 39:36:471] | dRU7 [-494:36:-62, 62:36:494] | dRU8 [-481:36:-49, 49:36:481] | dRU9 [-468:36:-36, 36:36:468] | dRU10 [-491:36:-59, 59:36:491] |
| | dRU11 [-478:36:-46, 46:36:478] | dRU12 [-465:36:-33, 33:36:465] | dRU13 [-488:36:-56, 56:36:488] | dRU14 [-475:36:-43, 43:36:475] | dRU15 [-498:36:-66, 66:36:498] |
| | dRU16 [-485:36:-53, 53:36:485] | dRU17 [-472:36:-40, 40:36:472] | dRU18 [-495:36:-63, 63:36:495] | dRU19 [not defined] | dRU20 [-482:36:-50, 50:36:482] |
| | dRU21 [-469:36:-37, 37:36:469] | dRU22 [-492:36:-60, 60:36:492] | dRU23 [-479:36:-47, 47:36:479] | dRU24 [-466:36:-34, 34:36:466] | dRU25 [-489:36:-57, 57:36:489] |
| | dRU26 [-476:36:-44, 44:36:476] | dRU27 [-499:36:-67, 67:36:499] | dRU28 [-486:36:-54, 54:36:486] | dRU29 [-473:36:-41, 41:36:473] | dRU30 [-496:36:-64, 64:36:496] |
| | dRU31 [-483:36:-51, 51:36:483] | dRU32 [-470:36:-38, 38:36:470] | dRU33 [-493:36:-61, 61:36:493] | dRU34 [-480:36:-48, 48:36:480] | dRU35 [-467:36:-35, 35:36:467] |
| | dRU36 [-490:36:-58, 58:36:490] | dRU37 [-477:36:-45, 45:36:477] | | | |

FIG. 4A

Data and pilot subcarrier indices for Distributed RUs (dRU) in a 80 MHz EHT TB PPDU for 6GHz LPI

| | | | | |
|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] |
| | dRU6 26-tone [dRU12, dRU13] | dRU7 26-tone [dRU15, dRU16] | dRU8 26-tone [dRU17, dRU18] | dRU9 26-tone [dRU20, dRU21] | dRU10 26-tone [dRU22, dRU23] |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] |
| | dRU16 26-tone [dRU36, dRU37] | | | | |
| 106-tone dRU i=1:8 | dRU1 26-tone [dRU1~4], [-32, 32] | dRU2 26-tone [dRU6~9], [-26, 26] | dRU3 26-tone [dRU10~13], [-23, 23] | dRU4 26-tone [dRU15~18], [-30, 30] | dRU5 26-tone [dRU20~23], [-24, 24] |
| | dRU6 26-tone [dRU25~28], [-31, 31] | dRU7 26-tone [dRU29~32], [-28, 28] | dRU8 26-tone [dRU34~37], [-22, 22] | | |
| 242-tone dRU i=1:4 | dRU1 106-tone [dRU1~2], [-29,-19,19,29], 26-tone dRU5 | dRU2 106-tone [dRU3~4], [-27,-20,20,27], 26-tone dRU14 | | | |
| | dRU3 106-tone [dRU5~6], [-24,-18,18,24], 26-tone dRU24 | dRU4 106-tone [dRU7~8], [-25,-15,15,25], 26-tone dRU33 | | | |
| 484-tone dRU i=1:2 | dRU1 242-tone [dRU1~2] | dRU2 242-tone [dRU3~4] | | | |

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-500:36:-68, 3:36:435] | dRU2 [-487:36:-55, 16:36:448] | dRU3 [-474:36:-42, 29:36:461] | dRU4 [-497:36:-65, 6:36:438] | dRU5 [-484:36:-52, 19:36:451] |
| | dRU6 [-471:36:-39, 32:36:464] | dRU7 [-494:36:-62, 9:36:441] | dRU8 [-481:36:-49, 22:36:454] | dRU9 [-468:36:-36, 35:36:467] | dRU10 [-491:36:-59, 12:36:444] |
| | dRU11 [-478:36:-46, 25:36:457] | dRU12 [-465:36:-33, 38:36:470] | dRU13 [-488:36:-56, 15:36:447] | dRU14 [-475:36:-43, 28:36:460] | dRU15 [-498:36:-66, 5:36:437] |
| | dRU16 [-485:36:-53, 18:36:450] | dRU17 [-472:36:-40, 31:36:463] | dRU18 [-495:36:-63, 8:36:440] | dRU19 [not defined] | dRU20 [-482:36:-50, 21:36:453] |
| | dRU21 [-469:36:-37, 34:36:466] | dRU22 [-492:36:-60, 11:36:443] | dRU23 [-479:36:-47, 24:36:456] | dRU24 [-466:36:-34, 37:36:469] | dRU25 [-489:36:-57, 14:36:446] |
| | dRU26 [-476:36:-44, 27:36:459] | dRU27 [-499:36:-67, 4:36:436] | dRU28 [-486:36:-54, 17:36:449] | dRU29 [-473:36:-41, 30:36:462] | dRU30 [-496:36:-64, 7:36:439] |
| | dRU31 [-483:36:-51, 20:36:452] | dRU32 [-470:36:-38, 33:36:465] | dRU33 [-493:36:-61, 10:36:442] | dRU34 [-480:36:-48, 23:36:455] | dRU35 [-467:36:-35, 36:36:468] |
| | dRU36 [-490:36:-58, 13:36:445] | dRU37 [-477:36:-45, 26:36:458] | | | |

FIG. 5A

Data and pilot subcarrier indices for Distributed RUs (dRU) in a 80 MHz EHT TB PPDU for 6GHz LPI

| | | | | | | |
|---|---|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] | |
| | dRU6 26-tone [dRU12, dRU3] | dRU7 26-tone [dRU15, dRU16] | dRU8 26-tone [dRU17, dRU18] | dRU9 26-tone [dRU20, dRU21] | dRU10 26-tone [dRU22, dRU23] | |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] | |
| | dRU16 26-tone [dRU36, dRU37] | | | | | |
| 106-tone dRU i=1:8 | dRU1 26-tone [dRU1~4], [-32, 471] | dRU2 26-tone [dRU6~9], [-26, 477] | dRU3 26-tone [dRU10~13],[-23, 480] | dRU4 26-tone [dRU15~18],[-30, 473] | dRU5 26-tone [dRU20~23],[-24, 479] | |
| | dRU6 26-tone [dRU25~28],[-31, 472] | dRU7 26-tone [dRU29~32],[-28,475] | dRU8 26-tone [dRU34~37],[-22,481] | | | |
| 242-tone dRU i=1:4 | dRU1 106-tone [dRU1~2], [-29,-19,474,484], 26-tone dRU5 | | dRU2 106-tone [dRU3~4], [-27,-20,476,483], 26-tone dRU14 | | | |
| | dRU3 106-tone [dRU5~6], [-24,-18,482,485], 26-tone dRU24 | | dRU4 106-tone [dRU7~8], [-25,-15,478,488], 26-tone dRU33 | | | |
| 484-tone dRU i=1:2 | dRU1 242-tone [dRU1~2] | | dRU2 242-tone [dRU3~4] | | | |

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-474:36:-42, 42:36:474] | dRU2 [-461:36:-29, 29:36:461] | dRU3 [-448:36:-16, 16:36:448] | dRU4 [-471:36:-39, 39:36:471] | dRU5 [-458:36:-26, 26:36:458] |
| | dRU6 [-445:36:-13, 13:36:445] | dRU7 [-468:36:-36, 36:36:468] | dRU8 [-455:36:-23, 23:36:455] | dRU9 [-442:36:-10, 10:36:442] | dRU10 [-465:36:-33, 33:36:465] |
| | dRU11 [-452:36:-20, 20:36:452] | dRU12 [-439:36:-7, 7:36:439] | dRU13 [-462:36:-30, 30:36:462] | dRU14 [-449:36:-17, 17:36:449] | dRU15 [-472:36:-40, 40:36:472] |
| | dRU16 [-459:36:-27, 27:36:459] | dRU17 [-446:36:-14, 14:36:446] | dRU18 [-469:36:-37, 37:36:469] | dRU19 [not defined] | dRU20 [-456:36:-24, 24:36:456] |
| | dRU21 [-443:36:-11, 11:36:443] | dRU22 [-466:36:-34, 34:36:466] | dRU23 [-453:36:-21, 21:36:453] | dRU24 [-440:36:-8, 8:36:440] | dRU25 [-463:36:-31, 31:36:463] |
| | dRU26 [-450:36:-18, 18:36:450] | dRU27 [-473:36:-41, 41:36:473] | dRU28 [-460:36:-28, 28:36:460] | dRU29 [-447:36:-15, 15:36:447] | dRU30 [-470:36:-38, 38:36:470] |
| | dRU31 [-457:36:-25, 25:36:457] | dRU32 [-444:36:-12, 12:36:444] | dRU33 [-467:36:-35, 35:36:467] | dRU34 [-454:36:-22, 22:36:454] | dRU35 [-441:36:-9, 9:36:441] |
| | dRU36 [-464:36:-32, 32:36:464] | dRU37 [-451:36:-19, 19:36:451] | | | |

FIG. 6A

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 26-tone [dRU1, dRU2] | dRU2 26-tone [dRU3, dRU4] | dRU3 26-tone [dRU5, dRU6] | dRU4 26-tone [dRU7, dRU8] | dRU5 26-tone [dRU9, dRU10] |
| | dRU6 26-tone [dRU11, dRU12] | dRU7 26-tone [dRU13, dRU14] | dRU8 26-tone [dRU15, dRU16] | dRU9 26-tone [dRU17, dRU18] | dRU10 26-tone [dRU19, dRU20] |
| | dRU11 26-tone [dRU21, dRU22] | dRU12 26-tone [dRU23, dRU24] | dRU13 26-tone [dRU25, dRU26] | dRU14 26-tone [dRU27, dRU28] | dRU15 26-tone [dRU29, dRU30] |
| | dRU16 26-tone [dRU31, dRU32] | | | | |
| 106-tone dRU i=1:8 | dRU1 26-tone [dRU1~4], [-491,-481,481,491] | dRU2 26-tone [dRU5~8], [-489,-479,479,489] | dRU3 26-tone [dRU9~12], [-487,-477,477,487] | dRU4 26-tone [dRU13~16], [-485,-475,475,485] | dRU5 26-tone [dRU17~20], [-483,-473,473,483] |
| | dRU6 26-tone [dRU21~24], [-488,-478,478,488] | dRU7 26-tone [dRU25~28], [-486,-476,476,486] | dRU8 26-tone [dRU29~32], [-484,-474,474,484] | | |
| 242-tone dRU i=1:4 | dRU1 106-tone [dRU1~2], [-491,-481,481,491], 26-tone dRU3 | | dRU2 106-tone [dRU3~4], [-488,-482,482,488], 26-tone dRU4 | | |
| | dRU3 106-tone [dRU5~6], [-489,-479,479,489], 26-tone dRU6 | | dRU4 106-tone [dRU7~8], [-487,-480,480,487], 26-tone dRU7 | | |
| 484-tone dRU i=1:2 | dRU1 242-tone [dRU1~2] | | dRU2 242-tone [dRU3~4] | | |

Data and pilot subcarrier indices for Distributed RUs (dRU) in a 80 MHz EHT TB PPDU for 6GHz LPI

| dRU type | | | dRU index and subcarrier range | | |
|---|---|---|---|---|---|
| 26-tone dRU i=1:37 | dRU1 [-470:36:-38, 3:36:435] | dRU2 [-457:36:-25, 16:36:448] | dRU3 [-444:36:-12, 29:36:461] | dRU4 [-467:36:-35, 6:36:438] | dRU5 [-454:36:-22, 19:36:451] |
| | dRU6 [-441:36:-9, 32:36:464] | dRU7 [-464:36:-32, 9:36:441] | dRU8 [-451:36:-19, 22:36:454] | dRU9 [-438:36:-6, 35:36:467] | dRU10 [-461:36:-29, 12:36:444] |
| | dRU11 [-448:36:-16, 25:36:457] | dRU12 [-435:36:-3, 38:36:470] | dRU13 [-458:36:-26, 15:36:447] | dRU14 [-445:36:-13, 28:36:460] | dRU15 [-468:36:-36, 5:36:437] |
| | dRU16 [-455:36:-23, 18:36:450] | dRU17 [-442:36:-10, 31:36:463] | dRU18 [-465:36:-33, 8:36:440] | dRU19 [not defined] | dRU20 [-452:36:-20, 21:36:453] |
| | dRU21 [-439:36:-7, 34:36:466] | dRU22 [-462:36:-30, 11:36:443] | dRU23 [-449:36:-17, 24:36:456] | dRU24 [-436:36:-4, 37:36:469] | dRU25 [-459:36:-27, 14:36:446] |
| | dRU26 [-446:36:-14, 27:36:459] | dRU27 [-469:36:-37, 4:36:436] | dRU28 [-456:36:-24, 17:36:449] | dRU29 [-443:36:-11, 30:36:462] | dRU30 [-466:36:-34, 7:36:439] |
| | dRU31 [-453:36:-21, 20:36:452] | dRU32 [-440:36:-8, 33:36:465] | dRU33 [-463:36:-31, 10:36:442] | dRU34 [-450:36:-18, 23:36:455] | dRU35 [-437:36:-5, 36:36:468] |
| | dRU36 [-460:36:-28, 13:36:445] | dRU37 [-447:36:-15, 26:36:458] | | | |

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] |
| | dRU6 26-tone [dRU12, dRU3] | dRU7 26-tone [dRU15, dRU16] | dRU8 26-tone [dRU17, dRU18] | dRU9 26-tone [dRU20, dRU21] | dRU10 26-tone [dRU22, dRU23] |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] |
| | dRU16 26-tone [dRU36, dRU37] | | | | |
| 106-tone dRU i=1:8 | dRU1 26-tone [dRU1~4],[-480, 471] | dRU2 26-tone [dRU6~9],[-474, 477] | dRU3 26-tone [dRU10~13],[-471, 480] | dRU4 26-tone [dRU15~18],[-478, 473] | dRU5 26-tone [dRU20~23],[-475, 479] |
| | dRU6 26-tone [dRU25~28],[-482, 472] | dRU7 26-tone [dRU29~32],[-476, 475] | dRU8 26-tone [dRU34~37],[-473, 481] | | |
| 242-tone dRU i=1:4 | dRU1 106-tone [dRU1~2], [-487,-477, 474, 484], 26-tone dRU5 | | dRU2 106-tone [dRU3~4], [-484,-481, 476, 483], 26-tone dRU14 | | |
| | dRU3 106-tone [dRU5~6], [-485,-472, 482, 485], 26-tone dRU24 | | dRU4 106-tone [dRU7~8], [-483,-479, 478, 488], 26-tone dRU33 | | |
| 484-tone dRU i=1:2 | dRU1 242-tone [dRU1~2] | | dRU2 242-tone [dRU3~4] | | |

FIG. 7B (A)

| dRU size | RUstart (r) | {I(i)} |
|---|---|---|
| 26 | {V, V+1} | {0} |
| 52 | {0,8,4,12,6,14,2,10,1,9,5,13,7,15,3,11} | {0,16} |
| 106 | {0,4,6,2,1,5,7,3} | {0,8,16,24} |
| 242 | {0,2,1,3} | {0:4:32} |
| 484 | {0,1} | {0:2:34} |

(B)

| dRU size | RUstart (r) | {I(i)} |
|---|---|---|
| 26 | {V, V+2} | {0} |
| 52 | {0,8,4,12,1,9,5,13,2,10,6,14,3,11,7,15} | {0,16} |
| 106 | {0,4,1,5,2,6,3,7} | {0,8,16,24} |
| 242 | {0,1,2,3} | {0:4:32} |

| dRU size | RUstart (r) | {l(i)} |
|---|---|---|
| 26 | {V, V+1} | {0} |
| 52 | {0,8,4,12,2,10,6,14,1,9,5,13,3,11,7,15} | {0,18} |
| 106 | {0,4,2,6,1,5,3,7} | {0,8,18,26} |
| 242 | {0,2,1,3} | [0:4:16, 18:4:30] for dRU1,3<br>[0:4:12, 18:4:30, 32] for dRU2,4 |
| 484 | {0,1} | {0,2:34} |

(B)

| dRU size | RUstart (r) | {l(i)} |
|---|---|---|
| 26 | {V, V+2} | {0} |
| 52 | {0,8,4,12,1,9,5,13,2,10,6,14,3,11,7,15} | {0,18} |
| 106 | {0,4,1,5,2,6,3,7} | {0,8,18,26} |
| 242 | {0,1,2,3} | [0:4:16, 18:4:30] for dRU1,2<br>[0:4:12, 18:4:30, 32] for dRU3,4 |

| dRU size | RUstart (r) | {I(i)} |
|---|---|---|
| 26 | {V, V+1} | {0} |
| 52 | {0,9,5,14,2,11,7,16,1,10,6,15,3,12,8,17} | {0,18} |
| 106 | {0,5,2,7,1,6,3,8} | {0:9:27} |
| 242 | {0,2,1,3} | [0:9:27, 5:9:32,4] for dRU1<br>[0:9:27, 5:9:32,20] for dRU2<br>[0:9:27, 5:9:32,12] for dRU3<br>[0:9:27, 5:9:32,28] for dRU4 |
| 484 | {0,1} | [0,2,4,5,7,9,11,14,16,18,20,22,23,25,27,29,32,34] for dRU1<br>[0,2,4,7,9,11,12,14,16,18,20,23,25,27,29,30,32,34] for dRU2 |

(B)

| dRU size | RUstart (r) | {I(i)} |
|---|---|---|
| 26 | {V, V+2} | {0} |
| 52 | {0,9,5,14,1,10,6,15,2,11,7,16,3,12,8,17} | {0,18} |
| 106 | {0,5,1,6,2,7,3,8} | {0:9:27} |
| 242 | {0,1,2,3} | [0:9:27, 5:9:32,4] for dRU1<br>[0:9:27, 5:9:32,12] for dRU2<br>[0:9:27, 5:9:32,20] for dRU3<br>[0:9:27, 5:9:32,28] for dRU2 |

| dRU size | RUstart (r) {V} | {I(i)} |
|---|---|---|
| 26 | {0,9,4,13,2,11,6,15,1,10,5,14,3,12,7,16} | {0} |
| 52 | {0,4,2,6,1,5,3,7} | {0,18} |
| 106 | {0,2,1,3} | {0:9:27} |
| 242 | {0,1} | [0:9:27, 4:9:31,8] for dRU1<br>[0:9:27, 4:9:31,24] for dRU2<br>[0:9:27, 4:9:31,16] for dRU3<br>[0:9:27, 4:9:31,32] for dRU4 |
| 484 | | [0:2:8,9:2:15,18:2:26,27:2:33]<br>[0:2:6,9:2:15,16:2:24,27:2:33,34] |

(B)

| dRU size | RUstart (r) {V} | {I(i)} |
|---|---|---|
| 26 | {0,9,4,13,1,10,5,14,2,11,6,15,3,12,7,16} | {0} |
| 52 | {0,4,1,5,2,6,3,7} | {0,18} |
| 106 | {0,1,2,3} | {0:9:27} |
| 242 | | [0:9:27, 4:9:31,8] for dRU1<br>[0:9:27, 4:9:31,16] for dRU2<br>[0:9:27, 4:9:31,24] for dRU3<br>[0:9:27, 4:9:31,32] for dRU4 |

Data and pilot subcarrier indices for Distributed RUs (dRU) in a 80 MHz EHT TB PPDU for 6GHz LPI dRU index and subcarrier range

| dRU type | | | | | |
|---|---|---|---|---|---|
| 26-tone dRU i=1..37 | dRU1 [-500:36:-68, 68:36:500] | dRU2 [-482:36:-50, 50:36:482] | dRU3 [-491:36:-59, 59:36:491] | dRU4 [-473:36:-41, 41:36:473] | dRU5 [-492:36:-60, 60:36:492] |
| | dRU6 [-496:36:-64, 64:36:496] | dRU7 [-478:36:-46, 46:36:478] | dRU8 [-487:36:-55, 55:36:487] | dRU9 [-469:36:-37, 37:36:469] | dRU10 [-498:36:-66, 66:36:498] |
| | dRU11 [-480:36:-48, 48:36:480] | dRU12 [-489:36:-57, 57:36:489] | dRU13 [-471:36:-39, 39:36:471] | dRU14 [-474:36:-42, 42:36:474] | dRU15 [-494:36:-62, 62:36:494] |
| | dRU16 [-476:36:-44, 44:36:476] | dRU17 [-485:36:-53, 53:36:485] | dRU18 [-467:36:-35, 35:36:467] | dRU19 [not defined] | dRU20 [-499:36:-67, 67:36:499] |
| | dRU21 [-481:36:-49, 49:36:481] | dRU22 [-490:36:-58, 58:36:490] | dRU23 [-472:36:-40, 40:36:472] | dRU24 [-483:36:-51, 51:36:483] | dRU25 [-495:36:-63, 63:36:495] |
| | dRU26 [-477:36:-45, 45:36:477] | dRU27 [-486:36:-54, 54:36:486] | dRU28 [-468:36:-36, 36:36:468] | dRU29 [-497:36:-65, 65:36:497] | dRU30 [-479:36:-47, 47:36:479] |
| | dRU31 [-488:36:-56, 56:36:488] | dRU32 [-470:36:-38, 38:36:470] | dRU33 [-465:36:-33, 33:36:465] | dRU34 [-493:36:-61, 61:36:493] | dRU35 [-475:36:-43, 43:36:475] |
| | dRU36 [-484:36:-52, 52:36:484] | dRU37 [-466:36:-34, 34:36:466] | | | |

FIG. 12A

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] |
| | dRU6 26-tone [dRU12, dRU3] | dRU7 26-tone [dRU15, dRU16] | dRU8 26-tone [dRU17, dRU18] | dRU9 26-tone [dRU20, dRU21] | dRU10 26-tone [dRU22, dRU23] |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] |
| | dRU16 26-tone [dRU36, dRU37] | | | | |
| 106-tone dRU i=1:8 | dRU1 26-tone [dRU1~4], [-32, 32] | dRU2 26-tone [dRU6~9], [-28, 28] | dRU3 26-tone [dRU10~13], [-30, 30] | dRU4 26-tone [dRU15~18], [-26, 26] | dRU5 26-tone [dRU20~23], [-31, 31] |
| | dRU6 26-tone [dRU25~28], [-27, 27] | dRU7 26-tone [dRU29~32], [-29, 29] | dRU8 26-tone [dRU34~37], [-25, 25] | | |
| 242-tone dRU i=1:4 | dRU1 106-tone [dRU1~2], [-24,-23,23,24], 26-tone dRU5 | | dRU2 106-tone [dRU3~4], [-21,-17,17,21], 26-tone dRU14 | | |
| | dRU3 106-tone [dRU5~6], [-22,-18,18,22], 26-tone dRU24 | | dRU4 106-tone [dRU7~8], [-20,-16,16,20], 26-tone dRU33 | | |
| 484-tone dRU i=1:2 | dRU1 242-tone [dRU1~2] | | dRU2 242-tone [dRU3~4] | | |

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-500:36:-68, 68:36:500] | dRU2 [-482:36:-50, 50:36:482] | dRU3 [-491:36:-59, 59:36:491] | dRU4 [-473:36:-41, 41:36:473] | dRU5 [-492:36:-60, 60:36:492] |
| | dRU6 [-496:36:-64, 64:36:496] | dRU7 [-478:36:-46, 46:36:478] | dRU8 [-487:36:-55, 55:36:487] | dRU9 [-469:36:-37, 37:36:469] | dRU10 [-498:36:-66, 66:36:498] |
| | dRU11 [-480:36:-48, 48:36:480] | dRU12 [-489:36:-57, 57:36:489] | dRU13 [-471:36:-39, 39:36:471] | dRU14 [-474:36:-42, 42:36:474] | dRU15 [-494:36:-62, 62:36:494] |
| | dRU16 [-476:36:-44, 44:36:476] | dRU17 [-485:36:-53, 53:36:485] | dRU18 [-467:36:-35, 35:36:467] | dRU19 [not defined] | dRU20 [-499:36:-67, 67:36:499] |
| | dRU21 [-481:36:-49, 49:36:481] | dRU22 [-490:36:-58, 58:36:490] | dRU23 [-472:36:-40, 40:36:472] | dRU24 [-483:36:-51, 51:36:483] | dRU25 [-495:36:-63, 63:36:495] |
| | dRU26 [-477:36:-45, 45:36:477] | dRU27 [-486:36:-54, 54:36:486] | dRU28 [-468:36:-36, 36:36:468] | dRU29 [-497:36:-65, 65:36:497] | dRU30 [-479:36:-47, 47:36:479] |
| | dRU31 [-488:36:-56, 56:36:488] | dRU32 [-470:36:-38, 38:36:470] | dRU33 [-465:36:-33, 33:36:465] | dRU34 [-493:36:-61, 61:36:493] | dRU35 [-475:36:-43, 43:36:475] |
| | dRU36 [-484:36:-52, 52:36:484] | dRU37 [-466:36:-34, 34:36:466] | | | |

FIG. 13A

Data and pilot subcarrier indices for Distributed RUs (dRU) in a 80 MHz EHT TB PPDU for 6GHz LPI

| | | | | |
|---|---|---|---|---|
| 52-tone dRU i=1:16 | dRU1 [-500:18:-50, 50:18:500] | dRU2 [-491:18:-41, 41:18:491] | dRU3 [-496:18:-46, 46:18:496] | dRU4 [-487:18:-37, 37:18:487] | dRU5 [-498:18:-48, 48:18:498] |
| | dRU6 [-489:18:-39, 39:18:489] | dRU7 [-494:18:-44, 44:18:494] | dRU8 [-485:18:-35, 35:18:485] | dRU9 [-499:18:-49, 49:18:499] | dRU10 [-490:18:-40, 40:18:490] |
| | dRU11 [-495:18:-45, 45:18:495] | dRU12 [-486:18:-36, 36:18:486] | dRU13 [-497:18:-47, 47:18:497] | dRU14 [-488:18:-38, 38:18:488] | dRU15 [-493:18:-43, 43:18:493] |
| | dRU16 [-484:18:-34, 34:18:484] | | | | |
| 106-tone dRU i=1:8 | dRU1 [-500:9:-32, 32:9:500] | dRU2 [-496:9:-28, 28:9:496] | dRU3 [-498:9:-30, 30:9:498] | dRU4 [-494:9:-26, 26:9:494] | dRU5 [-499:9:-31, 31:9:499] |
| | dRU6 [-495:9:-27, 27:9:495] | dRU7 [-497:9:-29, 29:9:497] | dRU8 [-493:9:-25, 25:9:493] | | |
| 242-tone dRU i=1:4 | dRU1 106-tone [dRU1~2], [-24,-23,23,24], 26-tone dRU5 | | dRU2 106-tone [dRU3~4], [-21,-17,17,21], 26-tone dRU14 | | |
| | dRU3 106-tone [dRU5~6], [-22,-18,18,22], 26-tone dRU24 | | dRU4 106-tone [dRU7~8], [-20,-16,16,20], 26-tone dRU33 | | |
| 484-tone dRU i=1:2 | dRU1 242-tone [dRU1~2] | | dRU2 242-tone [dRU3~4] | | |

FIG. 13B

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-500:36:-68, 3:36:435] | dRU2 [-482:36:-50, 21:36:453] | dRU3 [-491:36:-59, 12:36:444] | dRU4 [-473:36:-41, 30:36:462] | dRU5 [-492:36:-60, 11:36:443] |
| | dRU6 [-496:36:-64, 7:36:439] | dRU7 [-478:36:-46, 25:36:457] | dRU8 [-487:36:-55, 16:36:448] | dRU9 [-469:36:-37, 34:36:466] | dRU10 [-498:36:-66, 5:36:437] |
| | dRU11 [-480:36:-48, 23:36:455] | dRU12 [-489:36:-57, 14:36:446] | dRU13 [-471:36:-39, 32:36:464] | dRU14 [-474:36:-42, 29:36:461] | dRU15 [-494:36:-62, 9:36:441] |
| | dRU16 [-476:36:-44, 27:36:459] | dRU17 [-485:36:-53, 18:36:450] | dRU18 [-467:36:-35, 36:36:468] | dRU19 [not defined] | dRU20 [-499:36:-67, 4:36:436] |
| | dRU21 [-481:36:-49, 22:36:454] | dRU22 [-490:36:-58, 13:36:445] | dRU23 [-472:36:-40, 31:36:463] | dRU24 [-483:36:-51, 20:36:452] | dRU25 [-495:36:-63, 8:36:440] |
| | dRU26 [-477:36:-45, 26:36:458] | dRU27 [-486:36:-54, 17:36:449] | dRU28 [-468:36:-36, 35:36:467] | dRU29 [-497:36:-65, 6:36:438] | dRU30 [-479:36:-47, 24:36:456] |
| | dRU31 [-488:36:-56, 15:36:447] | dRU32 [-470:36:-38, 33:36:465] | dRU33 [-465:36:-33, 38:36:470] | dRU34 [-493:36:-61, 10:36:442] | dRU35 [-475:36:-43, 28:36:460] |
| | dRU36 [-484:36:-52, 19:36:451] | dRU37 [-466:36:-34, 37:36:469] | | | |

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1<br>26-tone [dRU1, dRU2] | dRU2<br>26-tone [dRU3, dRU4] | dRU3<br>26-tone [dRU6, dRU7] | dRU4<br>26-tone [dRU8, dRU9] | dRU5<br>26-tone [dRU10, dRU11] |
| | dRU6<br>26-tone [dRU12, dRU3] | dRU7<br>26-tone [dRU15, dRU16] | dRU8<br>26-tone [dRU17, dRU18] | dRU9<br>26-tone [dRU20, dRU21] | dRU10<br>26-tone [dRU22, dRU23] |
| | dRU11<br>26-tone [dRU25, dRU26] | dRU12<br>26-tone [dRU27, dRU28] | dRU13<br>26-tone [dRU29, dRU30] | dRU14<br>26-tone [dRU31, dRU32] | dRU15<br>26-tone [dRU34, dRU35] |
| | dRU16<br>26-tone [dRU36, dRU37] | | | | |
| 106-tone dRU i=1:8 | dRU1<br>26-tone [dRU1~4], [-32, 471] | dRU2<br>26-tone [dRU6~9], [-28, 475] | dRU3<br>26-tone [dRU10~13],[-30, 473] | dRU4<br>26-tone [dRU15~18],[-26, 477] | dRU5<br>26-tone [dRU20~23],[-31, 472] |
| | dRU6<br>26-tone [dRU25~28],[-27, 476] | dRU7<br>26-tone [dRU29~32],[-29, 474] | dRU8<br>26-tone [dRU34~37],[-25, 478] | | |
| 242-tone dRU i=1:4 | dRU1<br>106-tone [dRU1~2], [-24,-23, 479, 480], 26-tone dRU5 | | dRU2<br>106-tone [dRU3~4], [-21,-17, 482, 486], 26-tone dRU14 | | |
| | dRU3<br>106-tone [dRU5~6], [-22,-18, 481, 485], 26-tone dRU24 | | dRU4<br>106-tone [dRU7~8], [-20,-16, 483, 487], 26-tone dRU33 | | |
| 484-tone dRU i=1:2 | dRU1<br>242-tone [dRU1~2] | | dRU2<br>242-tone [dRU3~4] | | |

FIG. 14B

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-500:36:-68, 3:36:435] | dRU2 [-482:36:-50, 21:36:453] | dRU3 [-491:36:-59, 12:36:444] | dRU4 [-473:36:-41, 30:36:462] | dRU5 [-492:36:-60, 11:36:443] |
| | dRU6 [-496:36:-64, 7:36:439] | dRU7 [-478:36:-46, 25:36:457] | dRU8 [-487:36:-55, 16:36:448] | dRU9 [-469:36:-37, 34:36:466] | dRU10 [-498:36:-66, 5:36:437] |
| | dRU11 [-480:36:-48, 23:36:455] | dRU12 [-489:36:-57, 14:36:446] | dRU13 [-471:36:-39, 32:36:464] | dRU14 [-474:36:-42, 29:36:461] | dRU15 [-494:36:-62, 9:36:441] |
| | dRU16 [-476:36:-44, 27:36:459] | dRU17 [-485:36:-53, 18:36:450] | dRU18 [-467:36:-35, 36:36:468] | dRU19 [not defined] | dRU20 [-499:36:-67, 4:36:436] |
| | dRU21 [-481:36:-49, 22:36:454] | dRU22 [-490:36:-58, 13:36:445] | dRU23 [-472:36:-40, 31:36:463] | dRU24 [-483:36:-51, 20:36:452] | dRU25 [-495:36:-63, 8:36:440] |
| | dRU26 [-477:36:-45, 26:36:458] | dRU27 [-486:36:-54, 17:36:449] | dRU28 [-468:36:-36, 35:36:467] | dRU29 [-497:36:-65, 6:36:438] | dRU30 [-479:36:-47, 24:36:456] |
| | dRU31 [-488:36:-56, 15:36:447] | dRU32 [-470:36:-38, 33:36:465] | dRU33 [-465:36:-33, 38:36:470] | dRU34 [-493:36:-61, 10:36:442] | dRU35 [-475:36:-43, 28:36:460] |
| | dRU36 [-484:36:-52, 19:36:451] | dRU37 [-466:36:-34, 37:36:469] | | | |

FIG. 15A

Data and pilot subcarrier indices for Distributed RUs (dRU) in a 80 MHz EHT TB PPDU for 6GHz LPI

| | | | | | |
|---|---|---|---|---|---|
| 52-tone dRU<br>i=1:16 | dRU1<br>[-500:18:-50, 3:18:453] | dRU2<br>[-491:18:-41, 12:18:462] | dRU3<br>[-496:18:-46, 7:18:457] | dRU4<br>[-487:18:-37, 16:18:466] | dRU5<br>[-498:18:-48, 5:18:455] |
| | dRU6<br>[-489:18:-39, 14:18:464] | dRU7<br>[-494:18:-44, 9:18:459] | dRU8<br>[-485:18:-35, 18:18:468] | dRU9<br>[-499:18:-49, 4:18:454] | dRU10<br>[-490:18:-40, 13:18:463] |
| | dRU11<br>[-495:18:-45, 8:18:458] | dRU12<br>[-486:18:-36, 17:18:467] | dRU13<br>[-497:18:-47, 6:18:456] | dRU14<br>[-488:18:-38, 15:18:465] | dRU15<br>[-493:18:-43, 10:18:460] |
| | dRU16<br>[-484:18:-34, 19:18:469] | | | | |
| 106-tone dRU<br>i=1:8 | dRU1<br>[-500:9:-32, 3:9:471] | dRU2<br>[-496:9:-28, 7:9:475] | dRU3<br>[-498:9:-30, 5:9:473] | dRU4<br>[-494:9:-26, 9:9:477] | dRU5<br>[-499:9:-31, 4:9:472] |
| | dRU6<br>[-495:9:-27, 8:9:476] | dRU7<br>[-497:9:-29, 6:9:474] | dRU8<br>[-493:9:-25, 10:9:478] | | |
| 242-tone dRU<br>i=1:4 | dRU1<br>106-tone {dRU1~2}, [-24,-23,479,480], 26-tone dRU5 | | dRU2<br>106-tone {dRU3~4}, [-21,-17,482,486], 26-tone dRU14 | | |
| | dRU3<br>106-tone {dRU5~6}, [-22,-18,481,485], 26-tone dRU24 | | dRU4<br>106-tone {dRU7~8}, [-20,-16,483,487], 26-tone dRU33 | | |
| 484-tone dRU<br>i=1:2 | dRU1<br>242-tone {dRU1~2} | | dRU2<br>242-tone {dRU3~4} | | |

Table 1600: Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-474:36:-42, 42:36:474] | dRU2 [-456:36:-24, 24:36:456] | dRU3 [-465:36:-33, 33:36:465] | dRU4 [-447:36:-15, 15:36:447] | dRU5 [-466:36:-34, 34:36:466] |
| | dRU6 [-470:36:-38, 38:36:470] | dRU7 [-452:36:-20, 20:36:452] | dRU8 [-461:36:-29, 29:36:461] | dRU9 [-443:36:-11, 11:36:443] | dRU10 [-472:36:-40, 40:36:472] |
| | dRU11 [-454:36:-22, 22:36:454] | dRU12 [-463:36:-31, 31:36:463] | dRU13 [-445:36:-13, 13:36:445] | dRU14 [-448:36:-16, 16:36:448] | dRU15 [-468:36:-36, 36:36:468] |
| | dRU16 [-450:36:-18, 18:36:450] | dRU17 [-459:36:-27, 27:36:459] | dRU18 [-441:36:-9, 9:36:441] | dRU19 [not defined] | dRU20 [-473:36:-41, 41:36:473] |
| | dRU21 [-455:36:-23, 23:36:455] | dRU22 [-464:36:-32, 32:36:464] | dRU23 [-446:36:-14, 14:36:446] | dRU24 [-457:36:-25, 25:36:457] | dRU25 [-469:36:-37, 37:36:469] |
| | dRU26 [-451:36:-19, 19:36:451] | dRU27 [-460:36:-28, 28:36:460] | dRU28 [-442:36:-10, 10:36:442] | dRU29 [-471:36:-39, 39:36:471] | dRU30 [-453:36:-21, 21:36:453] |
| | dRU31 [-462:36:-30, 30:36:462] | dRU32 [-444:36:-12, 12:36:444] | dRU33 [-439:36:-7, 7:36:439] | dRU34 [-467:36:-35, 35:36:467] | dRU35 [-449:36:-17, 17:36:449] |
| | dRU36 [-458:36:-26, 26:36:458] | dRU37 [-440:36:-8, 8:36:440] | | | |

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] |
| | dRU6 26-tone [dRU12, dRU3] | dRU7 26-tone [dRU15, dRU16] | dRU8 26-tone [dRU17, dRU18] | dRU9 26-tone [dRU20, dRU21] | dRU10 26-tone [dRU22, dRU23] |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] |
| | dRU16 26-tone [dRU36, dRU37] | | | | |
| 106-tone dRU i=1:8 | dRU1 26-tone [dRU1~4],[-483, 483] | dRU2 26-tone [dRU6~9],[-479, 479] | dRU3 26-tone [dRU10~13],[-481, 481] | dRU4 26-tone [dRU15~18],[-477, 477] | dRU5 26-tone [dRU20~23],[-482, 482] |
| | dRU6 26-tone [dRU25~28],[-478, 478] | dRU7 26-tone [dRU29~32],[-480, 480] | dRU8 26-tone [dRU34~37],[-476, 476] | | |
| 242-tone dRU i=1:4 | dRU1 106-tone [dRU1~2], [-492, -488,488,492], 26-tone dRU5 | | dRU2 106-tone [dRU3~4], [-486,-484,484,486], 26-tone dRU14 | | |
| | dRU3 106-tone [dRU5~6], [-491,-487,487,491], 26-tone dRU24 | | dRU4 106-tone [dRU7~8], [-485,-475,475,485], 26-tone dRU33 | | |
| 484-tone dRU i=1:2 | dRU1 242-tone [dRU1~2] | | dRU2 242-tone [dRU3~4] | | |

Data and pilot subcarrier indices for Distributed RUs (dRU) in a 80 MHz EHT TB PPDU for 6GHz LPI dRU index and subcarrier range

| dRU type | | | | | |
|---|---|---|---|---|---|
| 26-tone dRU i=1:37 | dRU1 [-474:36:-42, 42:36:474] | dRU2 [-456:36:-24, 24:36:456] | dRU3 [-465:36:-33, 33:36:465] | dRU4 [-447:36:-15, 15:36:447] | dRU5 [-466:36:-34, 34:36:466] |
| | dRU6 [-470:36:-38, 38:36:470] | dRU7 [-452:36:-20, 20:36:452] | dRU8 [-461:36:-29, 29:36:461] | dRU9 [-443:36:-11, 11:36:443] | dRU10 [-472:36:-40, 40:36:472] |
| | dRU11 [-454:36:-22, 22:36:454] | dRU12 [-463:36:-31, 31:36:463] | dRU13 [-445:36:-13, 13:36:445] | dRU14 [-448:36:-16, 16:36:448] | dRU15 [-468:36:-36, 36:36:468] |
| | dRU16 [-450:36:-18, 18:36:450] | dRU17 [-459:36:-27, 27:36:459] | dRU18 [-441:36:-9, 9:36:441] | dRU19 [not defined] | dRU20 [-473:36:-41, 41:36:473] |
| | dRU21 [-455:36:-23, 23:36:455] | dRU22 [-464:36:-32, 32:36:464] | dRU23 [-446:36:-14, 14:36:446] | dRU24 [-457:36:-25, 25:36:457] | dRU25 [-469:36:-37, 37:36:469] |
| | dRU26 [-451:36:-19, 19:36:451] | dRU27 [-460:36:-28, 28:36:460] | dRU28 [-442:36:-10, 10:36:442] | dRU29 [-471:36:-39, 39:36:471] | dRU30 [-453:36:-21, 21:36:453] |
| | dRU31 [-462:36:-30, 30:36:462] | dRU32 [-444:36:-12, 12:36:444] | dRU33 [-439:36:-7, 7:36:439] | dRU34 [-467:36:-35, 35:36:467] | dRU35 [-449:36:-17, 17:36:449] |
| | dRU36 [-458:36:-26, 26:36:458] | dRU37 [-440:36:-8, 8:36:440] | | | |

FIG. 17A

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 [-474:18:-24, 24:18:474] | dRU2 [-465:18:-15, 15:18:465] | dRU3 [-470:18:-20, 20:18:470] | dRU4 [-461:18:-11, 11:18:461] | dRU5 [-472:18:-22, 22:18:472] |
| | dRU6 [-463:18:-13, 13:18:463] | dRU7 [-468:18:-18, 18:18:468] | dRU8 [-459:18:-9, 9:18:459] | dRU9 [-473:18:-23, 23:18:473] | dRU10 [-464:18:-14, 14:18:464] |
| | dRU11 [-469:18:-19, 19:18:469] | dRU12 [-460:18:-10, 10:18:460] | dRU13 [-471:18:-21, 21:18:471] | dRU14 [-462:18:-12, 12:18:462] | dRU15 [-467:18:-17, 17:18:467] |
| | dRU16 [-458:18:-8, 8:18:458] | | | | |
| 106-tone dRU i=1:8 | dRU1 [-483:9:-15, 15:9:483] | dRU2 [-479:9:-11, 11:9:479] | dRU3 [-481:9:-13, 13:9:481] | dRU4 [-477:9:-9, 9:9:477] | dRU5 [-482:9:-14, 14:9:482] |
| | dRU6 [-478:9:-10, 10:9:478] | dRU7 [-480:9:-12, 12:9:480] | dRU8 [-476:9:-8, 8:9:476] | | |
| 242-tone dRU i=1:4 | dRU1 106-tone [dRU1~2], [-492,-488,488,492], 26-tone dRU5 | | dRU2 106-tone [dRU3~4], [-486,-484,484,486], 26-tone dRU14 | | |
| | dRU3 106-tone [dRU5~6], [-491,-487,487,491], 26-tone dRU24 | | dRU4 106-tone [dRU7~8], [-485,-475,475,485], 26-tone dRU33 | | |
| 484-tone dRU i=1:2 | dRU1 242-tone [dRU1~2] | | dRU2 242-tone [dRU3~4] | | |

Data and pilot subcarrier indices for Distributed RUs (dRU) in a 80 MHz EHT TB PPDU for 6GHz LPI

| dRU type | dRU index and subcarrier range | | | | |
|---|---|---|---|---|---|
| 26-tone dRU i=1:37 | dRU1 [-470:36:-38, 3:36:435] | dRU2 [-452:36:-20, 21:36:453] | dRU3 [-461:36:-29, 12:36:444] | dRU4 [-443:36:-11, 30:36:462] | dRU5 [-462:36:-30, 11:36:443] |
| | dRU6 [-466:36:-34, 7:36:439] | dRU7 [-448:36:-16, 25:36:457] | dRU8 [-457:36:-25, 16:36:448] | dRU9 [-439:36:-7, 34:36:466] | dRU10 [-468:36:-36, 5:36:437] |
| | dRU11 [-450:36:-18, 23:36:455] | dRU12 [-459:36:-27, 14:36:446] | dRU13 [-441:36:-9, 32:36:464] | dRU14 [-444:36:-12, 29:36:461] | dRU15 [-464:36:-32, 9:36:441] |
| | dRU16 [-446:36:-14, 27:36:459] | dRU17 [-455:36:-23, 18:36:450] | dRU18 [-437:36:-5, 36:36:468] | dRU19 [not defined] | dRU20 [-469:36:-37, 4:36:436] |
| | dRU21 [-451:36:-19, 22:36:454] | dRU22 [-460:36:-28, 13:36:445] | dRU23 [-442:36:-10, 31:36:463] | dRU24 [-453:36:-20, 21:36:452] | dRU25 [-465:36:-33, 8:36:440] |
| | dRU26 [-447:36:-15, 26:36:458] | dRU27 [-456:36:-24, 17:36:449] | dRU28 [-438:36:-6, 35:36:467] | dRU29 [-467:36:-35, 6:36:438] | dRU30 [-449:36:-17, 24:36:456] |
| | dRU31 [-458:36:-26, 15:36:447] | dRU32 [-440:36:-8, 33:36:465] | dRU33 [-435:36:-3, 38:36:470] | dRU34 [-463:36:-31, 10:36:442] | dRU35 [-445:36:-13, 28:36:460] |
| | dRU36 [-454:36:-22, 19:36:451] | dRU37 [-436:36:-4, 37:36:469] | | | |

FIG. 18A

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 26-tone [dRU1, dRU2] | dRU2 26-tone [dRU3, dRU4] | dRU3 26-tone [dRU6, dRU7] | dRU4 26-tone [dRU8, dRU9] | dRU5 26-tone [dRU10, dRU11] |
| | dRU6 26-tone [dRU12, dRU13] | dRU7 26-tone [dRU15, dRU16] | dRU8 26-tone [dRU17, dRU18] | dRU9 26-tone [dRU20, dRU21] | dRU10 26-tone [dRU22, dRU23] |
| | dRU11 26-tone [dRU25, dRU26] | dRU12 26-tone [dRU27, dRU28] | dRU13 26-tone [dRU29, dRU30] | dRU14 26-tone [dRU31, dRU32] | dRU15 26-tone [dRU34, dRU35] |
| | dRU16 26-tone [dRU36, dRU37] | | | | |
| 106-tone dRU i=1:8 | dRU1 26-tone [dRU1~4],[-479, 471] | dRU2 26-tone [dRU6~9],[-475, 475] | dRU3 26-tone [dRU10~13],[-477, 473] | dRU4 26-tone [dRU15~18],[-473, 477] | dRU5 26-tone [dRU20~23],[-478, 472] |
| | dRU6 26-tone [dRU25~28],[-474, 476] | dRU7 26-tone [dRU29~32],[-476, 474] | dRU8 26-tone [dRU34~37],[-472, 478] | | |
| 242-tone dRU i=1:4 | dRU1 106-tone [dRU1~2],[-488,-484,479,480]; 26-tone dRU5 | dRU2 106-tone [dRU3~4],[-482,-480,482,486]; 26-tone dRU14 | | | |
| | dRU3 106-tone [dRU5~6],[-487,-483,481,485]; 26-tone dRU24 | dRU4 106-tone [dRU7~8],[-481,-471,483,487]; 26-tone dRU33 | | | |
| 484-tone dRU i=1:2 | dRU1 242-tone [dRU1~2] | dRU2 242-tone [dRU3~4] | | | |

FIG. 18B

| dRU type | Data and pilot subcarrier indices for Distributed RUs (dRU) in a 80 MHz EHT TB PPDU for 6GHz LPI | | | | |
|---|---|---|---|---|---|
| | dRU index and subcarrier range | | | | |
| 26-tone dRU i=1:37 | dRU1 [-470:36:-38, 3:36:435] | dRU2 [-452:36:-20, 21:36:453] | dRU3 [-461:36:-29, 12:36:444] | dRU4 [-443:36:-11, 30:36:462] | dRU5 [-462:36:-30, 11:36:443] |
| | dRU6 [-466:36:-34, 7:36:439] | dRU7 [-448:36:-16, 25:36:457] | dRU8 [-457:36:-25, 16:36:448] | dRU9 [-439:36:-7, 34:36:466] | dRU10 [-468:36:-36, 5:36:437] |
| | dRU11 [-450:36:-18, 23:36:455] | dRU12 [-459:36:-27, 14:36:446] | dRU13 [-441:36:-9, 32:36:464] | dRU14 [-444:36:-12, 29:36:461] | dRU15 [-464:36:-32, 9:36:441] |
| | dRU16 [-446:36:-14, 27:36:459] | dRU17 [-455:36:-23, 18:36:450] | dRU18 [-437:36:-5, 36:36:468] | dRU19 [not defined] | dRU20 [-469:36:-37, 4:36:436] |
| | dRU21 [-451:36:-19, 22:36:454] | dRU22 [-460:36:-28, 13:36:445] | dRU23 [-442:36:-10, 31:36:463] | dRU24 [-453:36:-20, 21:36:452] | dRU25 [-465:36:-33, 8:36:440] |
| | dRU26 [-447:36:-15, 26:36:458] | dRU27 [-456:36:-24, 17:36:449] | dRU28 [-438:36:-6, 35:36:467] | dRU29 [-467:36:-35, 6:36:438] | dRU30 [-449:36:-17, 24:36:456] |
| | dRU31 [-458:36:-26, 15:36:447] | dRU32 [-440:36:-8, 33:36:465] | dRU33 [-435:36:-3, 38:36:470] | dRU34 [-463:36:-31, 10:36:442] | dRU35 [-445:36:-13, 28:36:460] |
| | dRU36 [-454:36:-22, 19:36:451] | dRU37 [-436:36:-4, 37:36:469] | | | |

FIG. 19A

Data and pilot subcarrier indices for Distributed RUs (dRU) in a 80 MHz EHT TB PPDU for 6GHz LPI

| | | | | | |
|---|---|---|---|---|---|
| 52-tone dRU i=1:16 | dRU1 [-470:18:-20, 3:18:453] | dRU2 [-461:18:-11, 12:18:462] | dRU3 [-466:18:-16, 7:18:457] | dRU4 [-457:18:-7, 16:18:466] | dRU5 [-468:18:-18, 5:18:455] |
| | dRU6 [-459:18:-9, 14:18:464] | dRU7 [-464:18:-14, 9:18:459] | dRU8 [-455:18:-5, 18:18:468] | dRU9 [-469:18:-19, 4:18:454] | dRU10 [-460:18:-10, 13:18:463] |
| | dRU11 [-465:18:-15, 8:18:458] | dRU12 [-456:18:-6, 17:18:467] | dRU13 [-467:18:-17, 6:18:456] | dRU14 [-458:18:-8, 15:18:465] | dRU15 [-463:18:-13, 10:18:460] |
| | dRU16 [-454:18:-4, 19:18:469] | | | | |
| 106-tone dRU i=1:8 | dRU1 [-479:9:-11, 3:9:471] | dRU2 [-475:9:-7, 7:9:475] | dRU3 [-477:9:-9, 5:9:473] | dRU4 [-473:9:-5, 9:9:477] | dRU5 [-478:9:-10, 4:9:472] |
| | dRU6 [-474:9:-6, 8:9:474] | dRU7 [-476:9:-8, 6:9:474] | dRU8 [-472:9:-4, 10:9:478] | | |
| 242-tone dRU i=1:4 | 106-tone [dRU1~2], [-488,-484,479,480], 26-tone dRU5 | | 106-tone [dRU3~4], [-482,-480,482,486], 26-tone dRU14 | | |
| | 106-tone [dRU5~6], [-487,-483,481,485], 26-tone dRU24 | | 106-tone [dRU7~8], [-481,-471,483,487], 26-tone dRU33 | | |
| 484-tone dRU i=1:2 | 242-tone [dRU1~2] | | 242-tone [dRU3~4] | | |

FIG. 19B

| RU size | RUstart (r) | {I(i)} |
|---|---|---|
| 26 | {V,V+1} | {0} |
| 52 | {0,8,4,12,6,14,2,10,1,9,5,13,7,15,3,11} | {0,16} |
| 106 | {0,4,6,2,1,5,7,3} | {0,8,16,24} |
| 242 | {0,2,1,3} | {0:4:32} |
| 484 | {0,1} | {0:2:34} |

| dRU type | Data and pilot subcarrier indices for distributed RUs (dRU) in a 80 MHz EHT TB PPDU for 6GHz LPI ||||||
|---|---|---|---|---|---|---|
| | dRU index and subcarrier range ||||||
| | dRU1 | dRU2 | dRU3 | dRU4 | dRU5 | dRU6 |
| | [-500:37:-56, 56:37:500] | [-484:37:-40, 40:37:484] | [-492:37:-48, 48:37:492] | [-476:37:-32, 32:37:476] | [-468:37:-24, 24:37:468] | [-496:37:-52, 52:37:496] |
| | dRU7 | dRU8 | dRU9 | dRU10 | dRU11 | dRU12 |
| | [-480:37:-36, 36:37:480] | [-488:37:-44, 44:37:488] | [-472:37:-28, 28:37:472] | [-494:37:-50, 50:37:494] | [-478:37:-34, 34:37:478] | [-486:37:-42, 42:37:486] |
| | dRU13 | dRU14 | dRU15 | dRU16 | dRU17 | dRU18 |
| | [-470:37:-26, 26:37:470] | [-466:37:-22, 22:37:466] | [-498:37:-54, 54:37:498] | [-482:37:-38, 38:37:482] | [-490:37:-46, 46:37:490] | [-474:37:-30, 30:37:474] |
| 26-tone dRU i=1:37 | dRU19 [not defined] | dRU20 | dRU21 | dRU22 | dRU23 | dRU24 |
| | | [-499:37:-55, 55:37:499] | [-483:37:-39, 39:37:483] | [-491:37:-47, 47:37:491] | [-475:37:-31, 31:37:475] | [-467:37:-23, 23:37:467] |
| | dRU25 | dRU26 | dRU27 | dRU28 | dRU29 | dRU30 |
| | [-495:37:-51, 51:37:495] | [-479:37:-35, 35:37:479] | [-487:37:-43, 43:37:487] | [-471:37:-27, 27:37:471] | [-493:37:-49, 49:37:493] | [-477:37:-33, 33:37:477] |
| | dRU31 | dRU32 | dRU33 | dRU34 | dRU35 | dRU36 |
| | [-485:37:-41, 41:37:485] | [-469:37:-25, 25:37:469] | [-465:37:-21, 21:37:465] | [-497:37:-53, 53:37:497] | [-481:37:-37, 37:37:481] | [-489:37:-45, 45:37:489] |
| | dRU37 | | | | | |
| | [-473:37:-29, 29:37:473] | | | | | |

Table 2100 — Data and pilot subcarrier indices for Distributed RUs (dRU) in a 80 MHz EHT TB PPDU for 6GHz LPI

| | dRU1 | dRU2 | dRU3 | dRU4 | dRU5 | dRU6 |
|---|---|---|---|---|---|---|
| 52-tone dRU i=1:16 | dRU1<br>26-tone [dRU1, dRU2] | 26-tone [dRU3, dRU4] | 26-tone [dRU6, dRU7] | 26-tone [dRU8, dRU9] | 26-tone [dRU10, dRU11] | dRU6<br>26-tone [dRU12, dRU3] |
| | dRU7<br>26-tone [dRU15, dRU16] | 26-tone [dRU17, dRU18] | dRU9<br>26-tone [dRU20, dRU21] | dRU10<br>26-tone [dRU22, dRU23] | dRU11<br>26-tone [dRU25, dRU26] | dRU12<br>26-tone [dRU27, dRU28] |
| | dRU13<br>26-tone [dRU29, dRU30] | dRU14<br>26-tone [dRU31, dRU32] | dRU15<br>26-tone [dRU34, dRU35] | dRU16<br>26-tone [dRU36, dRU37] | | |
| | dRU1<br>26-tone [dRU1~4], [-19, 19] | dRU2<br>26-tone [dRU6~9], [-15, 15] | dRU3<br>26-tone [dRU10~13], [-13, 13] | dRU4<br>26-tone [dRU15~18], [-17, 17] | dRU5<br>26-tone [dRU20~23], [-18, 18] | dRU6<br>26-tone [dRU25~28], [-14, 14] |
| 106-tone dRU i=1:8 | dRU7<br>26-tone [dRU29~32], [12, 12] | dRU8<br>26-tone [dRU34~37], [-16, 16] | | | | |
| | dRU1<br>106-tone [dRU1~2], [-11, -7, 7, 11], 26-tone dRU5 | | dRU2<br>106-tone [dRU3~4], [-9, -5, 5, 9], 26-tone dRU14 | | dRU3<br>106-tone [dRU5~6], [-10, -6, 6, 10], 26-tone dRU24 | |
| | dRU4<br>106-tone [dRU7~8], [-8, -4, 4, 8], 26-tone dRU33 | | | | | |
| 242-tone dRU i=1:4 | dRU1<br>242-tone [dRU1~2] | | dRU2<br>242-tone [dRU3~4] | | | |
| 484-tone dRU i=1:2 | 242-tone [dRU1~2] | | | | | |

Data and pilot subcarrier indices for Distributed RUs (dRU) in a 80 MHz EHT TB PPDU for 6GHz LPI

| dRU type | dRU index and subcarrier range | | | | | |
|---|---|---|---|---|---|---|
| 26-tone dRU i=1:37 | dRU1 [-486:37:-42, 42:37:483] | dRU2 [-470:37:-26, 26:37:470] | dRU3 [-478:37:-34, 34:37:478] | dRU4 [-462:37:-18, 18:37:462] | dRU5 [-454:37:-10, 10:37:454] | dRU6 [-482:37:-38, 38:37:482] |
| | dRU7 [-466:37:-22, 22:37:466] | dRU8 [-474:37:-30, 30:37:474] | dRU9 [-458:37:-14, 14:37:458] | dRU10 [-480:37:-36, 36:37:480] | dRU11 [-464:37:-20, 20:37:464] | dRU12 [-472:37:-28, 28:37:472] |
| | dRU13 [-456:37:-12, 12:37:456] | dRU14 [-452:37:-8, 8:37:452] | dRU15 [-484:37:-40, 40:37:484] | dRU16 [-468:37:-24, 24:37:468] | dRU17 [-476:37:-32, 32:37:476] | dRU18 [-460:37:-16, 16:37:460] |
| | dRU19 [not defined] | dRU20 [-485:37:-41, 41:37:485] | dRU21 [-469:37:-25, 25:37:469] | dRU22 [-477:37:-33, 33:37:477] | dRU23 [-461:37:-17, 17:37:461] | dRU24 [-453:37:-9, 9:37:453] |
| | dRU25 [-481:37:-37, 37:37:481] | dRU26 [-465:37:-21, 21:37:465] | dRU27 [-473:37:-29, 29:37:473] | dRU28 [-457:37:-13, 13:37:457] | dRU29 [-479:37:-35, 35:37:479] | dRU30 [-463:37:-19, 19:37:463] |
| | dRU31 [-471:37:-27, 27:37:471] | dRU32 [-455:37:-11, 11:37:452] | dRU33 [-451:37:-7, 7:37:451] | dRU34 [-483:37:-39, 39:37:483] | dRU35 [-467:37:-23, 23:37:467] | dRU36 [-475:37:-31, 31:37:475] |
| | dRU37 [-459:37:-15, 15:37:459] | | | | | |

FIG. 22A

Data and pilot subcarrier indices for Distributed RUs (dRU) in a 80 MHz EHT TB PPDU for 6GHz LPI

| | dRU1 | dRU2 | dRU3 | dRU4 | dRU5 | dRU6 |
|---|---|---|---|---|---|---|
| 52-tone dRU i=1..16 | dRU1 26-tone [dRU1, dRU2] | dRU2 26-tone [dRU3, dRU4] | dRU3 26-tone [dRU5, dRU6] | dRU4 26-tone [dRU7, dRU8] | dRU5 26-tone [dRU9, dRU10] | dRU6 26-tone [dRU11, dRU12] |
| | dRU7 26-tone [dRU15, dRU16] | dRU8 26-tone [dRU17, dRU18] | dRU9 26-tone [dRU20, dRU21] | dRU10 26-tone [dRU22, dRU23] | dRU11 26-tone [dRU25, dRU26] | dRU12 26-tone [dRU27, dRU28] |
| | dRU13 26-tone [dRU29, dRU30] | dRU14 26-tone [dRU31, dRU32] | dRU15 26-tone [dRU34, dRU35] | dRU16 26-tone [dRU36, dRU37] | | |
| 106-tone dRU i=1..8 | dRU1 26-tone [dRU1~4],[-499, 499] | dRU2 26-tone [dRU6~9],[-495, 495] | dRU3 26-tone [dRU10~13],[-493, 493] | dRU4 26-tone [dRU15~18],[-497, 497] | dRU5 26-tone [dRU20~23],[-498, 498] | dRU6 26-tone [dRU25~28],[-494, 494] |
| | dRU7 26-tone [dRU29~32],[-492, 492] | dRU8 26-tone [dRU34~37],[-496, 496] | | | | |
| 242-tone dRU i=1..4 | dRU1 106-tone [dRU1~2], [-491,-6,6,491], 26-tone dRU5 | | dRU2 106-tone [dRU3~4], [-489,-4,4,489], 26-tone dRU14 | | dRU3 106-tone [dRU5~6], [-490,-5,5,490], 26-tone dRU24 | |
| | dRU4 106-tone [dRU7~8], [-488,-3,3,488], 26-tone dRU33 | | | | | |
| 484-tone dRU i=1..2 | dRU1 242-tone [dRU1~2] | | | dRU2 242-tone [dRU3~4] | | |

Data and Pilot Subcarrier Indices of Distributed RUs (dRUs) in a 80MHz EHT TB PPDU for 6GHz LPI

| dRU type | dRU Index and Subcarrier Range | |
|---|---|---|
| 26-tone dRU<br>i=1:37 | dRU1<br>[-500:36:-284, -243:36:-63, 63:36:243, 284:36:500] | dRU2<br>[-487:36:-271, -230:36:-50, 50:36:230, 271:36:487] |
| | dRU6<br>[-471:36:-291, -250:36:-34, 34:36:250, 291:36:471] | dRU7<br>[-494:36:-278, -237:36:-57, 57:36:237, 278:36:494] |
| | dRU11<br>[-478:36:-262, -221:36:-41, 41:36:221, 262:36:478] | dRU12<br>[-465:36:-285, -244:36:-28, 28:36:244, 285:36:465] |
| | dRU16<br>[-485:36:-269, -228:36:-48, 48:36:228, 268:36:485] | dRU17<br>[-472:36:-292, -251:36:-35, 35:36:251, 292:36:472] |
| | dRU21<br>[-469:36:-289, -248:36:-32, 32:36:248, 289:36:469] | dRU22<br>[-492:36:-276, -235:36:-55, 55:36:235, 276:36:492] |
| | dRU26<br>[-476:36:-260, -219:36:-39, 39:36:219, 260:36:476] | dRU27<br>[-499:36:-283, -242:36:-62, 62:36:242, 283:36:499] |
| | dRU31<br>[-483:36:-267, -226:36:-46, 46:36:226, 267:36:483] | dRU32<br>[-470:36:-290, -249:36:-33, 33:36:249, 290:36:470] |
| | dRU36<br>[-490:36:-274, -233:36:-53, 53:36:233, 274:36:490] | dRU37<br>[-470:36:-261, -220:36:-40, 40:36:220, 261:36:470] |
| 52-tone dRU<br>i=1:16 | dRU1<br>26-tone [dRU1, dRU2] | dRU2<br>26-tone [dRU3, dRU4] |
| | dRU6<br>26-tone [dRU12, dRU3] | dRU7<br>26-tone [dRU15, dRU16] |
| | dRU11<br>26-tone [dRU25, dRU26] | dRU12<br>26-tone [dRU27, dRU28] |
| | dRU16<br>26-tone [dRU36, dRU37] | |
| 106-tone dRU<br>i=1:8 | dRU1<br>26-tone [dRU1~4], {-27, 27} | dRU2<br>26-tone [dRU6~9], {-21, 21} |
| | dRU6<br>26-tone [dRU25~28], {-26, 26} | dRU7<br>26-tone [dRU29~32], {-23, 23} |
| 242-tone dRU<br>i=1:4 | dRU1<br>106-tone [dRU1~2], {-24,-14,14,24}, 26-tone dRU5 | |
| | dRU3<br>106-tone [dRU5~6], {-16,-13,13,16}, 26-tone dRU24 | |
| 484-tone dRU<br>i=1:2 | dRU1<br>242-tone [dRU1~2] | |

Data and Pilot Subcarrier Indices of Distributed RUs (dRUs) in a 80MHz EHT TB PPDU for 6GHz LPI

| dRU type | dRU Index and Subcarrier Range | |
|---|---|---|
| 26-tone dRU i=1:37 | dRU3<br>{-474:36:-294, -253:36:-37, 37:36:253, 294:36:474} | dRU4<br>{-497:36:-281, -240:36:-60, 60:36:240, 281:36:497} |
| | dRU8<br>{-481:36:-265, -224:36:-44, 44:36:224, 265:36:481} | dRU9<br>{-468:36:-288, -247:36:-31, 31:36:247, 288:36:468} |
| | dRU13<br>{-488:36:-272, -231:36:-51, 51:36:231, 272:36:488} | dRU14<br>{-475:36:-259, -218:36:-38, 38:36:218, 259:36:475} |
| | dRU18<br>{-495:36:-279, -238:36:-58, 58:36:238, 279:36:495} | dRU19<br>[not defined] |
| | dRU23<br>{-479:36:-263, -222:36:-42, 42:36:222, 263:36:479} | dRU24<br>{-466:36:-286, -245:36:-29, 29:36:245, 286:36:466} |
| | dRU28<br>{-486:36:-270, -229:36:-49, 49:36:229, 270:36:486} | dRU29<br>{-473:36:-293, -252:36:-36, 36:36:252, 293:36:473} |
| | dRU33<br>{-493:36:-277, -236:36:-56, 56:36:236, 277:36:493} | dRU34<br>{-480:36:-264, -223:36:-43, 43:36:223, 264:36:480} |
| | | |
| 52-tone dRU i=1:16 | dRU3<br>26-tone [dRU6, dRU7] | dRU4<br>26-tone [dRU8, dRU9] |
| | dRU8<br>26-tone [dRU17, dRU18] | dRU9<br>26-tone [dRU20, dRU21] |
| | dRU13<br>26-tone [dRU29, dRU30] | dRU14<br>26-tone [dRU31, dRU32] |
| | | |
| 106-tone dRU i=1:8 | dRU3<br>26-tone [dRU10~13], [-18, 18] | dRU4<br>26-tone [dRU15~18], [-25, 25] |
| | dRU8<br>26-tone [dRU34~37], [-17, 17] | |
| 242-tone dRU i=1:4 | dRU2<br>106-tone [dRU3~4], [-22,-15,15,22], 26-tone dRU14 | |
| | dRU4<br>106-tone [dRU7~8], [-20,-12,12,20], 26-tone dRU33 | |
| 484-tone dRU i=1:2 | dRU2<br>242-tone [dRU3~4] | |

Data and Pilot Subcarrier Indices of Distributed RUs (dRUs) in a 80MHz EHT TB PPDU for 6GHz LPI

| dRU type | dRU Index and Subcarrier Range |
|---|---|
| 26-tone dRU i=1:37 | dRU5 [-484:36:-268, -227:36:-47, 47:36:227, 284:36:484] |
| | dRU10 [-491:36:-275, -234:36:-54, 54:36:234, 284:36:491] |
| | dRU15 [-498:36:-282, -241:36:-61, 61:36:241, 282:36:498] |
| | dRU20 [-482:36:-266, -225:36:-45, 45:36:225, 266:36:482] |
| | dRU25 [-489:36:-273, -232:36:-52, 52:36:232, 273:36:489] |
| | dRU30 [-496:36:-280, -239:36:-59, 59:36:239, 280:36:496] |
| | dRU35 [-467:36:-287, -246:36:-30, 30:36:246, 287:36:467] |
| | |
| 52-tone dRU i=1:16 | dRU5 26-tone [dRU10, dRU11] |
| | dRU10 26-tone [dRU22, dRU23] |
| | dRU15 26-tone [dRU34, dRU35] |
| | |
| 106-tone dRU i=1:8 | dRU5 26-tone [dRU20~23],[-19, 19] |
| | |
| 242-tone dRU i=1:4 | |
| | |
| 484-tone dRU i=1:2 | |

Data and Pilot Subcarrier Indices of Distributed RUs (dRUs) in a 80MHz EHT TB PPDU for 6GHz LPI

| dRU type | dRU Index and Subcarrier Range | |
|---|---|---|
| 26-tone dRU<br>i=1:37 | dRU1<br>[-484:36:-268, -227:36:-47, 47:36:227, 268:36:484] | dRU2<br>[-471:36:-291, -250:36:-34, 34:36:250, 291:36:471] |
| | dRU6<br>[-455:36:-275, -234:36:-18, 18:36:234, 275:36:455] | dRU7<br>[-478:36:-262, -221:36:-41, 41:36:221, 262:36:478] |
| | dRU11<br>[-462:36:-282, -242:36:-25, 25:36:242, 282:36:462] | dRU12<br>[-449:36:-269, -228:36:-12, 12:36:228, 269:36:449] |
| | dRU16<br>[-469:36:-289, -248:36:-32, 32:36:248, 289:36:469] | dRU17<br>[-456:36:-276, -235:36:-19, 19:36:235, 276:36:456] |
| | dRU21<br>[-453:36:-273, -232:36:-16, 16:36:232, 273:36:453] | dRU22<br>[-476:36:-260, -219:36:-39, 39:36:219, 260:36:476] |
| | dRU26<br>[-460:36:-280, -239:36:-23, 23:36:239, 280:36:460] | dRU27<br>[-483:36:-267, -226:36:-46, 46:36:226, 267:36:483] |
| | dRU31<br>[-467:36:-287, -246:36:-30, 30:36:246, 287:36:467] | dRU32<br>[-454:36:-274, -233:36:-17, 17:36:233, 274:36:454] |
| | dRU36<br>[-474:36:-281, -240:36:-24, 24:36:240, 281:36:474] | dRU37<br>[-461:36:-281, -240:36:-24, 24:36:240, 281:36:461] |
| 52-tone dRU<br>i=1:16 | dRU1<br>26-tone {dRU1, dRU2} | dRU2<br>26-tone {dRU3, dRU4} |
| | dRU6<br>26-tone {dRU12, dRU3} | dRU7<br>26-tone {dRU15, dRU16} |
| | dRU11<br>26-tone {dRU25, dRU26} | dRU12<br>26-tone {dRU27, dRU28} |
| | dRU16<br>26-tone {dRU36, dRU37} | |
| 106-tone dRU<br>i=1:8 | dRU1<br>26-tone {dRU1~4}, [-494, 494] | dRU2<br>26-tone {dRU6~9}, [-488, 488] |
| | dRU6<br>26-tone {dRU25~28}, [-496, 496] | dRU7<br>26-tone {dRU29~32}, [-490, 490] |
| 242-tone dRU<br>i=1:4 | dRU1<br>106-tone {dRU1~2}, [-500,-491, 491, 500], 26-tone dRU5 | |
| | dRU3<br>106-tone {dRU5~6}, [-499,-486, 486, 499], 26-tone dRU24 | |
| 484-tone dRU<br>i=1:2 | dRU1<br>242-tone {dRU1~2} | |

Data and Pilot Subcarrier Indices of Distributed RUs (dRUs) in a 80MHz EHT TB PPDU for 6GHz LPI

| dRU type | dRU Index and Subcarrier Range | |
|---|---|---|
| 26-tone dRU i=1:37 | dRU3 [-458:36:-278, -237:36:-21, 21:36:237, 278:36:458] | dRU4 [-481:36:-265, -224:36:-44, 44:36:224, 265:36:481] |
| | dRU8 [-465:36:-285, -244:36:-28, 28:36:244, 285:36:465] | dRU9 [-452:36:-272, -231:36:-15, 15:36:231, 272:36:452] |
| | dRU13 [-472:36:-292, -251:36:-35, 35:36:251, 292:36:472] | dRU14 [-459:36:-279, -238:36:-22, 22:36:238, 279:36:459] |
| | dRU18 [-479:36:-263, -222:36:-42, 42:36:222, 263:36:479] | dRU19 [not defined] |
| | dRU23 [-463:36:-283, -242:36:-26, 26:36:242, 283:36:463] | dRU24 [-450:36:-270, -229:36:-13, 13:36:229, 270:36:450] |
| | dRU28 [-470:36:-290, -249:36:-33, 33:36:249, 290:36:470] | dRU29 [-457:36:-277, -236:36:-20, 20:36:236, 277:36:457] |
| | dRU33 [-477:36:-261, -220:36:-40, 40:36:220, 261:36:477] | dRU34 [-464:36:-284, -243:36:-27, 27:36:243, 284:36:464] |
| | | |
| 52-tone dRU i=1:16 | dRU3 26-tone [dRU6, dRU7] | dRU4 26-tone [dRU8, dRU9] |
| | dRU8 26-tone [dRU17, dRU18] | dRU9 26-tone [dRU20, dRU21] |
| | dRU13 26-tone [dRU29, dRU30] | dRU14 26-tone [dRU31, dRU32] |
| | | |
| 106-tone dRU i=1:8 | dRU3 26-tone [dRU10~13], [-485, 485] | dRU4 26-tone [dRU15~18], [-492, 492] |
| | dRU8 26-tone [dRU34~37], [-487, 487] | |
| 242-tone dRU i=1:4 | dRU2 106-tone [dRU3~4], {-498,-495,495,498}, 26-tone dRU14 | |
| | dRU4 106-tone [dRU7~8], {-497,-493,493,497}, 26-tone dRU33 | |
| 484-tone dRU i=1:2 | dRU2 242-tone [dRU3~4] | |

Data and Pilot Subcarrier Indices of Distributed RUs (dRUs) in a 80MHz EHT TB PPDU for 6GHz LPI

| dRU type | dRU Index and Subcarrier Range |
|---|---|
| 26-tone dRU i=1:37 | dRU5 [-468:36:-288, -247:36:-31, 31:36:247, 288:36:468] |
| | dRU10 [-475:36:-259, -218:36:-38, 38:36:218, 259:36:475] |
| | dRU15 [-482:36:-266, -225:36:-45, 45:36:225, 266:36:482] |
| | dRU20 [-466:36:-286, -245:36:-29, 29:36:245, 286:36:466] |
| | dRU25 [-473:36:-293, -252:36:-36, 36:36:252, 293:36:473] |
| | dRU30 [-480:36:-264, -223:36:-43, 43:36:223, 264:36:480] |
| | dRU35 [-451:36:-271, -230:36:-14, 14:36:230, 271:36:451] |
| | |
| 52-tone dRU i=1:16 | dRU5 26-tone {dRU10, dRU11} |
| | dRU10 26-tone {dRU22, dRU23} |
| | dRU15 26-tone {dRU34, dRU35} |
| | |
| 106-tone dRU i=1:8 | dRU5 26-tone {dRU20~23},{-489, 489} |
| | |
| 242-tone dRU i=1:4 | |
| | |
| 484-tone dRU i=1:2 | |

FIG. 25C

Data and Pilot Subcarrier Indices of Distributed RUs (dRUs) in a 40MHz EHT TB PPDU for 6GHz LPI

| dRU Type | dRU index and subcarrier range | | | | | |
|---|---|---|---|---|---|---|
| 26-tone dRU i=1:18 | dRU1 [-240:18:-24, 24:18:240] | dRU2 [-231:18:-15, 15:18:231] | dRU3 [-236:18:-20, 20:18:236] | dRU4 [-227:18:-11, 11:18:227] | dRU5 [-232:18:-16, 16:18:232] | dRU6 [-238:18:-22, 22:18:238] |
| | dRU7 [-229:18:-13, 13:18:229] | dRU8 [-234:18:-18, 18:18:234] | dRU9 [-225:18:-9, 9:18:225] | dRU10 [-239:18:-23, 23:18:239] | dRU11 [-230:18:-14, 14:18:230] | dRU12 [-235:18:-19, 19:18:235] |
| | dRU13 [-226:18:-10, 10:18:226] | dRU14 [-223:18:-7, 7:18:223] | dRU15 [-237:18:-21, 21:18:237] | dRU16 [-228:18:-12, 12:18:228] | dRU17 [-233:18:-17, 17:18:233] | dRU18 [-224:18:-8, 8:18:224] |
| | dRU1 26-tone [dRU1, dRU2] | | dRU2 26-tone [dRU3, dRU4] | | dRU3 26-tone [dRU6, dRU7] | |
| 52-tone dRU i=1:8 | dRU4 26-tone [dRU8, dRU9] | | dRU5 26-tone [dRU10, dRU11] | | dRU6 26-tone [dRU12, dRU13] | |
| | dRU7 26-tone [dRU15, dRU16] | | dRU8 26-tone [dRU17, dRU18] | | | |
| 106-tone dRU i=1:4 | dRU1 26-tone [dRU1~4], [-6,6] | | dRU2 26-tone [dRU6~9], [-243,243] | | dRU3 26-tone [dRU10~13], [-244,244] | |
| | dRU4 26-tone [dRU15~18], [242,242] | | | | | |
| 242-tone dRU i=1:2 | dRU1 106-tone [dRU1~2], 26-tone dRU5, [-4,-3,3,4] | | dRU2 106-tone [dRU3~4], 26-tone dRU14, [-241,-5,5,241] | | | |

FIG. 28A

Data and Pilot Subcarrier Indices of Distributed RUs (dRUs) in a 40MHz EHT TB PPDU for 6GHz LPI

2800

| dRU Type | dRU index and subcarrier range | | | | | |
|---|---|---|---|---|---|---|
| | dRU1 | dRU2 | dRU3 | dRU4 | dRU5 | dRU6 |
| 26-tone dRU i=1:18 | [-240:18:-24, 24:18:240] | [-231:18:-15, 15:18:231] | [-236:18:-20, 20:18:236] | [-227:18:-11, 11:18:227] | [-232:18:-16, 16:18:232] | [-238:18:-22, 22:18:238] |
| | dRU7 | dRU8 | dRU9 | dRU10 | dRU11 | dRU12 |
| | [-229:18:-13, 13:18:229] | [-234:18:-18, 18:18:234] | [-225:18:-9, 9:18:225] | [-239:18:-23, 23:18:239] | [-230:18:-14, 14:18:230] | [-235:18:-19, 19:18:235] |
| | dRU13 | dRU14 | dRU15 | dRU16 | dRU17 | dRU18 |
| | [-226:18:-10, 10:18:226] | [-223:18:-7, 7:18:223] | [-237:18:-21, 21:18:237] | [-228:18:-12, 12:18:228] | [-233:18:-17, 17:18:233] | [-224:18:-8, 8:18:224] |
| 52-tone dRU i=1:8 | dRU1 [-240:9:-15, 15:9:240] | | dRU2 [-236:9:-11, 11:9:236] | | dRU3 [-238:9:-13, 13:9:238] | |
| | dRU4 [-234:9:-9, 9:9:234] | | dRU5 [-239:9:-14, 14:9:239] | | dRU6 [-235:9:-10, 10:9:235] | |
| | dRU7 [-237:9:-12, 12:9:237] | | dRU8 [-233:9:-8, 8:9:233] | | | |
| 106-tone dRU i=1:4 | dRU1 26-tone [dRU1~4], [-6,6] | | dRU2 26-tone [dRU6~9], [-243,243] | | dRU3 26-tone [dRU10~13], [-244,244] | |
| | dRU4 26-tone [dRU15~18], [242,242] | | | | | |
| 242-tone dRU i=1:2 | dRU1 106-tone [dRU1~2], 26-tone dRU5, [-4,-3,3,4] | | dRU2 106-tone [dRU3~4], 26-tone dRU14, [-241,-5,5,241] | | | |

FIG. 28B

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| 26-tone dRU<br>i=1,9 | dRU1<br>[-120:9:-12, 12:9:120] | dRU2<br>[-116:9:-8, 8:9:116] | dRU3<br>[-118:9:-10, 10:9:118] | dRU4<br>[-114:9:-6, 6:9:114] | dRU5<br>[-112:9:-4, 4:9:112] |
| | dRU6<br>[-119:9:-11, 11:9:119] | dRU7<br>[-115:9:-7, 7:9:115] | dRU8<br>[-117:9:-9, 9:9:117] | dRU9<br>[-113:9:-5, 5:9:113] | |
| 52-tone dRU<br>i=1,4 | dRU1<br>26-tone [dRU1,dRU2] | | dRU2<br>26-tone [dRU3,dRU4] | | |
| | dRU3<br>26-tone [dRU6,dRU7] | | dRU4<br>26-tone [dRU8,dRU9] | | |
| 106-tone dRU<br>i=1,2 | dRU1<br>26-tone [dRU1~4], [-122,122] | | dRU2<br>26-tone [dRU6~9], [-121,121] | | |

FIG. 29A

Data and Pilot Subcarrier Indices of Distributed RUs (dRUs) in a 20MHz EHT TB PPDU for 6GHz LPI

2900

| dRU Type | dRU index and subcarrier range | | | | |
|---|---|---|---|---|---|
| 26-tone dRU<br>i=1:9 | dRU1<br>[-119:9:-11, 11:9:119] | dRU2<br>[-115:9:-7, 7:9:115] | dRU3<br>[-117:9:-9, 9:9:117] | dRU4<br>[-113:9:-5, 5:9:113] | dRU5<br>[-111:9:-3, 3:9:111] |
| | dRU6<br>[-118:9:-10, 10:9:118] | dRU7<br>[-114:9:-6, 6:9:114] | dRU8<br>[-116:9:-8, 8:9:116] | dRU9<br>[-112:9:-4, 4:9:112] | |
| 52-tone dRU<br>i=1:4 | dRU1<br>26-tone [dRU1,dRU2] | | dRU2<br>26-tone [dRU3,dRU4] | | |
| | dRU3<br>26-tone [dRU6,dRU7] | | dRU4<br>26-tone [dRU8,dRU9] | | |
| 106-tone dRU<br>i=1:2 | dRU1<br>26-tone [dRU1~4], [-121,121] | | dRU2<br>26-tone [dRU6~9], [-120,120] | | |

FIG. 29B

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-121:9:-13, 13:9:121] | [-117:9:-9, 9:9:117] | [-119:9:-11, 11:9:119] | [-115:9:-7, 7:9:115] | [-113:9:-5, 5:9:113] |
| | dRU6 | dRU7 | dRU8 | dRU9 | |
| | [-120:9:-12, 12:9:120] | [-116:9:-8, 8:9:116] | [-118:9:-10, 10:9:118] | [-114:9:-6, 6:9:114] | |
| 52-tone dRU i=1:4 | dRU1 | dRU2 | dRU3 | dRU4 | |
| | 26-tone [dRU1,dRU2] | 26-tone [dRU3,dRU4] | 26-tone [dRU6,dRU7] | 26-tone [dRU8,dRU9] | |
| 106-tone dRU i=1:2 | dRU1 | dRU2 | | | |
| | 26-tone [dRU1~4], [-4,4] | 26-tone [dRU6~9], [-3,3] | | | |

FIG. 29C

| RU size | RUstart (r) | {l(i)} |
|---|---|---|
| 26 | {0, 5, 2, 7, 4, 1, 6, 3, 8} | {0} |
| 52 | {0, 2, 1, 3} | {0, 5} |
| 106 | {0, 1} | {0, 2, 5, 7} |

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-120:9:-12, 12:9:120] | [-115:9:-7, 7:9:115] | [-118:9:-10, 10:9:118] | [-113:9:-5, 5:9:113] | [-116:9:-8, 8:9:116] |
| | dRU6 | dRU7 | dRU8 | dRU9 | |
| | [-119:9:-11, 11:9:119] | [-114:9:-6, 6:9:114] | [-117:9:-9, 9:9:117] | [-112:9:-4, 4:9:112] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-3,3] | | dRU2 26-tone [dRU6~9], [-2,2] | | |

FIG. 31A

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-121:9:-13, 13:9:121] | [-116:9:-8, 8:9:116] | [-119:9:-11, 11:9:119] | [-114:9:-6, 6:9:114] | [-117:9:-9, 9:9:117] |
| | dRU6 | dRU7 | dRU8 | dRU9 | |
| | [-120:9:-12, 12:9:120] | [-115:9:-7, 7:9:115] | [-118:9:-10, 10:9:118] | [-113:9:-5, 5:9:113] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-4,4] | | dRU2 26-tone [dRU6~9], [-3,3] | | |

FIG. 31B

| dRU Type | | dRU1 | dRU2 | dRU3 | dRU4 | dRU5 |
|---|---|---|---|---|---|---|
| 26-tone dRU | | [-122:9:-14, 14:9:122] | [-117:9:-9, 9:9:117] | [-120:9:-12, 12:9:120] | [-115:9:-7, 7:9:115] | [-118:9:-10, 10:9:118] |
| i=1:9 | | dRU6 | dRU7 | dRU8 | dRU9 | |
| | | [-121:9:-13, 13:9:121] | [-116:9:-8, 8:9:116] | [-119:9:-11, 11:9:119] | [-114:9:-6, 6:9:114] | |
| 52-tone dRU | | dRU1 | | dRU2 | | |
| i=1:4 | | 26-tone [dRU1,dRU2] | | 26-tone [dRU3,dRU4] | | |
| | | dRU3 | | dRU4 | | |
| | | 26-tone [dRU6,dRU7] | | 26-tone [dRU8,dRU9] | | |
| 106-tone dRU | | dRU1 | | dRU2 | | |
| i=1:2 | | 26-tone [dRU1~4], [-5,5] | | 26-tone [dRU6~9], [-4,4] | | |

Data and Pilot Subcarrier Indices of Distributed RUs (dRUs) in a 20MHz EHT TB PPDU for 6GHz LPI

FIG. 31C

Data and Pilot Subcarrier Indices of Distributed RUs (dRUs) in a 20MHz EHT TB PPDU for 6GHz LPI

3200

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-118:9:-10, 10:9:118] | [-113:9:-5, 5:9:113] | [-116:9:-8, 8:9:116] | [-111:9:-3, 3:9:111] | [-114:9:-6, 6:9:114] |
| | dRU6 | dRU7 | dRU8 | dRU9 | |
| | [-117:9:-9, 9:9:117] | [-112:9:-4, 4:9:112] | [-115:9:-7, 7:9:115] | [-110:9:-2, 2:9:110] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-120,120] | | dRU2 26-tone [dRU6~9], [-119,119] | | |

FIG. 32A

Data and Pilot Subcarrier Indices of Distributed RUs (dRUs) in a 20MHz EHT TB PPDU for 6GHz LPI

3200 ⟶

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-119:9:-11, 11:9:119] | [-114:9:-6, 6:9:114] | [-117:9:-9, 9:9:117] | [-112:9:-4, 4:9:112] | [-115:9:-7, 7:9:115] |
| | dRU6 | dRU7 | dRU8 | dRU9 | |
| | [-118:9:-10, 10:9:118] | [-113:9:-5, 5:9:113] | [-116:9:-8, 8:9:116] | [-111:9:-3, 3:9:111] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-12,121] | | dRU2 26-tone [dRU6~9], [-120,120] | | |

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| 26-tone dRU<br>i=1,9 | dRU1<br>[-120:9:-12, 12:9:120] | dRU2<br>[-115:9:-7, 7:9:115] | dRU3<br>[-118:9:-10, 10:9:118] | dRU4<br>[-113:9:-5, 5:9:113] | dRU5<br>[-116:9:-8, 8:9:116] |
| | dRU6<br>[-119:9:-11, 11:9:119] | dRU7<br>[-114:9:-6, 6:9:114] | dRU8<br>[-117:9:-9, 9:9:117] | dRU9<br>[-112:9:-4, 4:9:112] | |
| 52-tone dRU<br>i=1,4 | dRU1<br>26-tone [dRU1,dRU2] | | dRU2<br>26-tone [dRU3,dRU4] | | |
| | dRU3<br>26-tone [dRU6,dRU7] | | dRU4<br>26-tone [dRU8,dRU9] | | |
| 106-tone dRU<br>i=1,2 | dRU1<br>26-tone [dRU1~4], [-122,122] | | dRU2<br>26-tone [dRU6~9], [-121,121] | | |

FIG. 32C

Data and Pilot Subcarrier Indices of Distributed RUs (dRUs) in a 20MHz EHT TB PPDU for 6GHz LPI

| dRU Type | dRU index and subcarrier range | | | | |
|---|---|---|---|---|---|
| 26-tone dRU i=1:9 | dRU1 [-120:9:-12, 2:9:110] | dRU2 [-115:9:-7, 7:9:115] | dRU3 [-118:9:-10, 4:9:112] | dRU4 [-113:9:-5, 9:9:117] | dRU5 [-116:9:-8, 6:9:114] |
| | dRU6 [-119:9:-11, 3:9:111] | dRU7 [-117:9:-9, 5:9:113] | dRU8 [-117:9:-9, 5:9:113] | dRU9 [-112:9:-4, 10:9:118] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-3,119] | | dRU2 26-tone [dRU6~9], [-2,120] | | |

FIG. 33A

Data and Pilot Subcarrier Indices of Distributed RUs (dRUs) in a 20MHz EHT TB PPDU for 6GHz LPI

3300

| dRU Type | dRU index and subcarrier range | | | | |
|---|---|---|---|---|---|
| | dRU1 | dRU2 | dRU3 | dRU4 | dRU5 |
| 26-tone dRU i=1:9 | [-118:9:-10, 2:9:110] | [-113:9:-5, 7:9:115] | [-116:9:-8, 4:9:112] | [-111:9:-3, 9:9:117] | [-114:9:-6, 6:9:114] |
| | dRU6 [-117:9:-9, 3:9:111] | dRU7 [-112:9:-4, 8:9:116] | dRU8 [-115:9:-7, 5:9:113] | dRU9 [-110:9:-2, 10:9:118] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-120,119] | | dRU2 26-tone [dRU6~9], [-119,120] | | |

FIG. 33B

3500 

```
┌─────────────────────────────────────────┐
│  DISTRIBUTE A PLURALITY OF SUBCARRIERS OF A │
│  RESOURCE UNIT (RU) TO GENERATE A DISTRIBUTED- │
│  TONE RU (dRU) OR A DISTRIBUTED-TONE MULTI-RU │
│  (DMRU) ON AN 80MHZ FREQUENCY SEGMENT OR │
│  SUBBLOCK                               │
│  3510                                   │
└─────────────────────────────────────────┘
                    ↓
┌─────────────────────────────────────────┐
│  COMMUNICATE WITH A COMMUNICATION ENTITY USING │
│        THE DRU OR THE DMRU              │
│                 3520                    │
└─────────────────────────────────────────┘
```

FIG. 35

OPTIMIZATION OF DISTRIBUTED-TONE RESOURCE UNIT AND MULTI-RESOURCE UNIT DESIGNS FOR TRANSMISSION IN 6GHz LPI SYSTEM

CROSS REFERENCE TO RELATED PATENT APPLICATION

The present disclosure is part of a non-provisional patent application claiming the priority benefit of U.S. Provisional Patent Application Nos. 63/179,600 and 63/186,850, filed 26 Apr. 2021 and 11 May 2021, respectively, the contents of which being incorporated by reference in their entirety.

TECHNICAL FIELD

The present disclosure is generally related to wireless communications and, more particularly, to optimization of distributed-tone resource unit (dRU) and distributed-tone multi-resource unit (dMRU) designs for transmission in a 6 GHz low-power indoor (LPI) system.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4 GHz and 5 GHz bands, the equivalent isotropically radiated power (EIRP) of a power spectral density (PSD) limit is capped at 20 dBm for 2 MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6 GHz LPI applications is far more stringent than PSD requirement for the 2.4 GHz and 5 GHz bands. For instance, the EIRP limit is at 5 dBm/MHz for an access point (AP) station (STA) in 6 GHz LPI versus an EIRP limit of 17 dBm/MHz for APs in the 5 GHz band. Similarly, the EIRP limit is at −1 dBm/MHz for a non-AP STA in 6 GHz LPI versus an EIRP limit of 11 dBm/MHz for APs in the 5 GHz band.

Distributed-tone RUs (dRUs) and distributed-tone multi-RUs (dMRUs) have been proposed to spread subcarriers or tones over a wider bandwidth to boost transmit power and extend coverage range. However, how the subcarriers or tones are distributed in constructing dRUs of different sizes in an optimized way have yet to be defined. Therefore, there is a need for a solution for optimization of dRU/dMRU designs for transmission in a 6 GHz LPI system.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to optimization of dRU/dMRU designs for transmission in a 6 GHz LPI system.

In one aspect, a method may involve distributing a plurality of subcarriers of a RU to generate a dRU or a distributed-tone multi-RU (dMRU) on an 80 MHz frequency segment or subblock. The method may also involve communicating with a communication entity using the dRU or the dMRU.

In yet another aspect, an apparatus may include a transceiver configured to transmit and receive wirelessly. The apparatus may also include a processor coupled to the transceiver. The processor may distribute a plurality of subcarriers of RU to generate a dRU or a dMRU on an 80 MHz frequency segment or subblock. The processor may also communicate, via the transceiver, with a communication entity (e.g., an AP STA or non-AP STA) using the dRU or the dMRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design under a proposed scheme in accordance with an implementation of the present disclosure.

FIG. 3A and FIG. 3B each shows a diagram of a respective portion of an example design under a proposed scheme in accordance with an implementation of the present disclosure.

FIG. 4A and FIG. 4B each shows a diagram of a respective portion of an example design under a proposed scheme in accordance with an implementation of the present disclosure.

FIG. 5A and FIG. 5B each shows a diagram of a respective portion of an example design under a proposed scheme in accordance with an implementation of the present disclosure.

FIG. 6A and FIG. 6B each shows a diagram of a respective portion of an example design under a proposed scheme in accordance with an implementation of the present disclosure.

FIG. 7A and FIG. 7B each shows a diagram of a respective portion of an example design under a proposed scheme in accordance with an implementation of the present disclosure.

FIG. 8A and FIG. 8B each shows a diagram of a respective portion of an example design under a proposed scheme in accordance with an implementation of the present disclosure.

FIG. 9A and FIG. 9B each shows a diagram of a respective portion of an example design under a proposed scheme in accordance with an implementation of the present disclosure.

FIG. 10A and FIG. 10B each shows a diagram of a respective portion of an example design under a proposed scheme in accordance with an implementation of the present disclosure.

FIG. 11A and FIG. 11B each shows a diagram of a respective portion of an example design under a proposed scheme in accordance with an implementation of the present disclosure.

FIG. 12A and FIG. 12B each shows a diagram of a respective portion of an example design under a proposed scheme in accordance with an implementation of the present disclosure.

FIG. 13A and FIG. 13B each shows a diagram of a respective portion of an example design under a proposed scheme in accordance with an implementation of the present disclosure.

FIG. 14A and FIG. 14B each shows a diagram of a respective portion of an example design under a proposed scheme in accordance with an implementation of the present disclosure.

FIG. 15A and FIG. 15B each shows a diagram of a respective portion of an example design under a proposed scheme in accordance with an implementation of the present disclosure.

FIG. 16A and FIG. 16B each shows a diagram of a respective portion of an example design under a proposed scheme in accordance with an implementation of the present disclosure.

FIG. 17A and FIG. 17B each shows a diagram of a respective portion of an example design under a proposed scheme in accordance with an implementation of the present disclosure.

FIG. 18A and FIG. 18B each shows a diagram of a respective portion of an example design under a proposed scheme in accordance with an implementation of the present disclosure.

FIG. 19A and FIG. 19B each shows a diagram of a respective portion of an example design under a proposed scheme in accordance with an implementation of the present disclosure.

FIG. 20A and FIG. 20B each shows a diagram of a respective portion of an example design under a proposed scheme in accordance with an implementation of the present disclosure.

FIG. 21A and FIG. 21B each shows a diagram of a respective portion of an example design under a proposed scheme in accordance with an implementation of the present disclosure.

FIG. 22A and FIG. 22B each shows a diagram of a respective portion of an example design under a proposed scheme in accordance with an implementation of the present disclosure.

FIG. 24A, FIG. 24B and FIG. 24C each shows a diagram of a respective portion of an example design under a proposed scheme in accordance with an implementation of the present disclosure.

FIG. 25A, FIG. 25B and FIG. 25C each shows a diagram of a respective portion of an example design under a proposed scheme in accordance with an implementation of the present disclosure.

FIG. 28A and FIG. 28B each shows a diagram of a respective portion of an example design under a proposed scheme in accordance with an implementation of the present disclosure.

FIG. 29A, FIG. 29B and FIG. 29C each shows a diagram of a respective portion of an example design under a proposed scheme in accordance with an implementation of the present disclosure.

FIG. 30A and FIG. 30B each shows a diagram of a respective portion of an example design under a proposed scheme in accordance with an implementation of the present disclosure.

FIG. 31A, FIG. 31B and FIG. 31C each shows a diagram of a respective portion of an example design under a proposed scheme in accordance with an implementation of the present disclosure.

FIG. 32A, FIG. 32B and FIG. 32C each shows a diagram of a respective portion of an example design under a proposed scheme in accordance with an implementation of the present disclosure.

FIG. 33A and FIG. 33B each shows a diagram of a respective portion of an example design under a proposed scheme in accordance with an implementation of the present disclosure.

FIG. 35 is a flowchart of an example process in accordance with an implementation of the present disclosure.

DETAILED DESCRIPTION OF PREFERRED EMBODIMENTS

Figure 1:
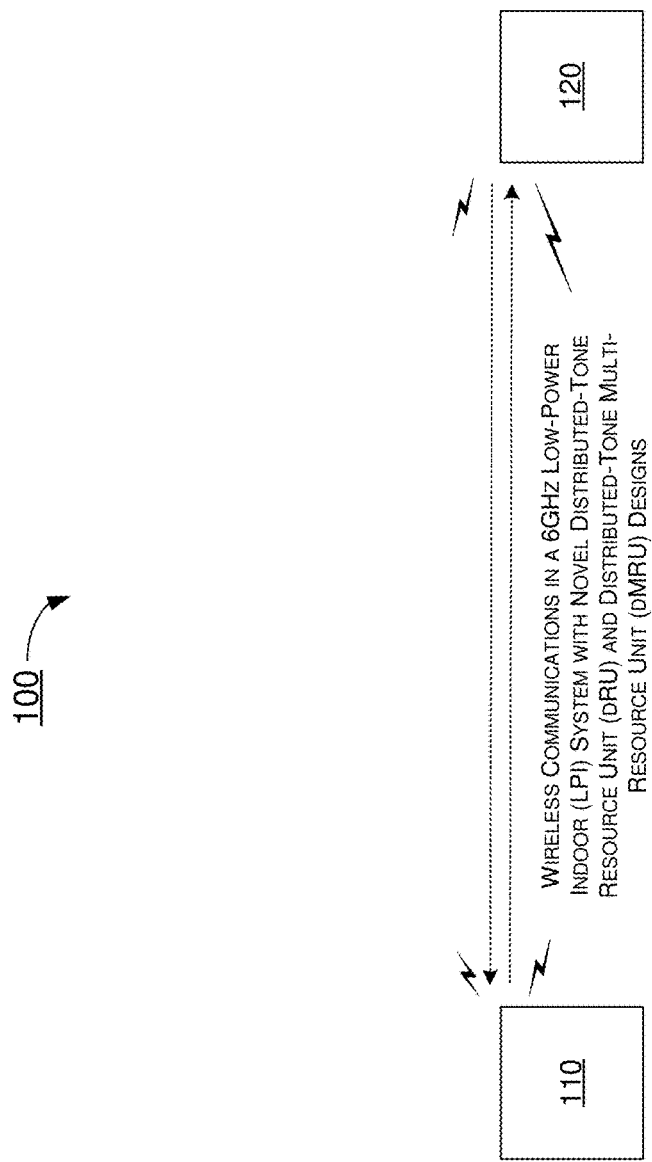
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of dRU/dMRU designs for transmission in a 6 GHz LPI system. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU (rRU) may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M. It is further noteworthy that, in the present disclosure, a 26-tone interleaved-tone or interlaced-tone RU may be interchangeably denoted as iRU26, a 52-tone interleaved-tone or interlaced-tone RU may be interchangeably denoted as iRU52, a 106-tone interleaved-tone or interlaced-tone RU may be interchangeably denoted as iRU106, a 242-tone interleaved-tone or interlaced-tone RU may be interchangeably denoted as iRU242, and a 484-tone interleaved-tone or interlaced-tone RU may be interchangeably denoted as iRU484. Additionally, the term "frequency segment" is interchangeably referred to as "frequency subblock" herein. Furthermore, for simplicity in notation, the term "dRU" herein may represent both dRU and dMRU.

FIG. 1 illustrates an example network environment 100 in which various solutions and schemes in accordance with the present disclosure may be implemented. FIG. 2~ FIG. 35 illustrate examples of implementation of various proposed schemes in network environment 100 in accordance with the present disclosure. The following description of various proposed schemes is provided with reference to FIG. 1~FIG. 35.

Referring to FIG. 1, network environment 100 may involve a communication entity 110 and a communication entity 120 communicating wirelessly (e.g., in a wireless local area network (WLAN) in accordance with one or more Institute of Electrical and Electronics Engineers (IEEE) 802.11 standards). For instance, communication entity 110 may be a first STA and communication entity 120 may be a second STA, with each of the first STA and second STA functioning as either an AP STA or a non-AP STA. Under various proposed schemes in accordance with the present disclosure, communication entity 110 and communication entity 120 may be configured to communicate wirelessly with optimization of dRU/dMRU designs for transmission in a 6 GHz LPI system under various proposed schemes of the present disclosure, as described herein.

Under various proposed schemes in accordance with the present disclosure, a 26-tone dRU (or dRU26) may be used as a basic building block to generate or otherwise construct dRUs and dMRUs of different sizes based on a similar hierarchical structure as that for regular RUs (rRUs). For instance, one 52-tone dRU (or dRU52) may be built from two 26-tone dRUs, one 106-tone dRU (or dRU106) may be built from two 52-tone dRUs (or four 26-tone dRUs plus two extra tones), one 242-tone dRU may be built from two 106-tone dRUs and one 26-tone dRU plus four extra tones (or nine 26-tone dRUs plus eight extra tones, and so on), one 484-tone dRU may be built from two 242-tone dRUs.

In the present disclosure, $N_p$ denotes a periodicity or repetition period (e.g., in number of tones). Under the various proposed schemes, the aforementioned dRU design may be updated or further optimized. For instance, $N_p=37$ may be extended to $N_p=36$ with several different options for the tone distribution pattern. Additionally, the tone distribution pattern may be optimized with $N_p=36$ to achieve optimal power boost gain for dRUs and dMRUs of all sizes. Moreover, the table of dRU subcarrier indices for $N_p=36$ is proposed herein for each option of tone distribution pattern with different tone-alignment methods such as, for example and without limitation, an edge-aligned and direct current (DC)-symmetric tone distribution pattern or a center-aligned and DC-symmetric tone distribution pattern. Furthermore, tables of dRU subcarrier indices are updated under the various proposed schemes.

FIG. 2 illustrates an example design 200 with respect to logical RU indices for BW80 in accordance with the present disclosure. In design 200, for consistency with labeling of regular RU indices, the 26-tone RU index 19 may be also assumed as "not defined" for a 26-tone dRU. Moreover, given a distribution bandwidth and a logical RU size, the tone distribution pattern of a dRU may be generated based on a formula as follows:

$$K_{td}(r, k) = RU_{start}(r) + l_{(i)} + j*N_p$$

Here, $N_p$ denotes a periodicity or repetition period (e.g., in number of tones); $l_{(i)}$ denotes a tone distribution pattern within one repetition period (e.g., every two or three tones, and so on); $i = \mod(k, L) = 0, 1, 2, \ldots, L-1$; $j = 0, 1, 2, \ldots,$ $$\left\lceil \frac{N_{st\_ru}}{L} \right\rceil - 1;$$

$k=0, 1, 2, \ldots, N_{st\_ru}-1$; $r=1, 2, \ldots, N_{ru}$, with r being the logical RU index. Moreover, $I_{(i)} \in \Omega_{ru} = \{l_{(0)}, l_{(1)}, \ldots, l_{(L-1)}\}$: $L = |\Omega_{ru}|$; $N_{st\_ru} = 26, 52, 106, 242, 484, 996$ for RU26, RU52, RU106, RU242, RU484, RU996, respectively. Additionally, $RU_{start}(r)$ represents the first or starting tone index for $dRU_r$; $l_{(i)}$ represents the tones within one repetition distance or one repetition period; $N_p$ represents the repetition distance or repetition period; L represents the number of tones within one repetition distance or one repetition period; $N_{st\_ru}$ represents the number of subcarriers (or tones) for a dRU; and $N_{ru}$ represents the number of dRUs for a given dRU size in a given bandwidth.

Figure 3A:
Figure 3B:
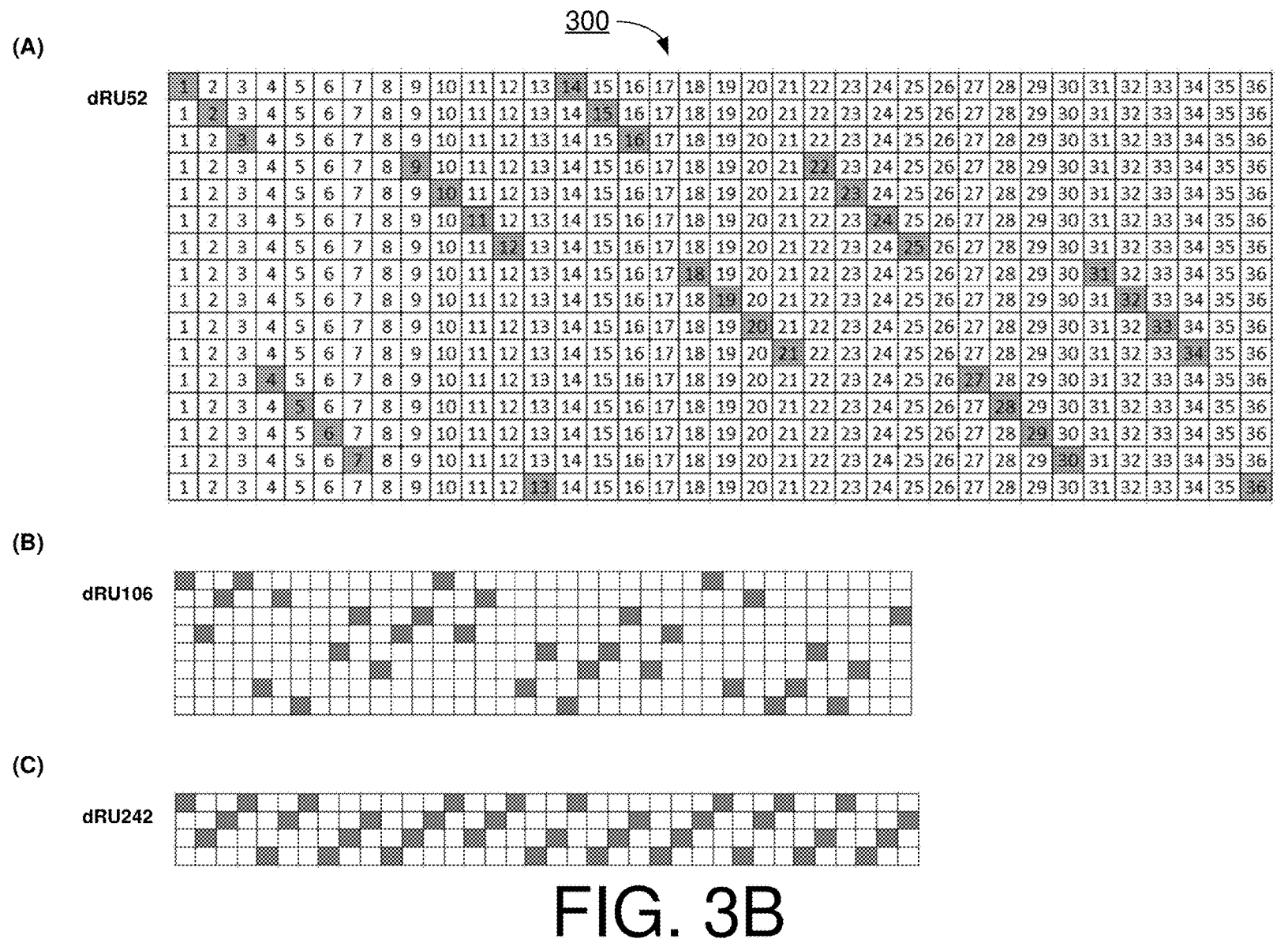

FIG. 3A and FIG. 3B each illustrates a respective portion of an example design 300 under a proposed scheme (Option 1) in accordance with the present disclosure. FIG. 3A shows a table listing the parameters $RU_{start}(r)$ and $l_{(i)}$ for dRUs of different sizes (e.g., dRU26, dRU52, dRU106, dRU242 and dRU484) with $N_p=36$ on BW80 under design 300. It is believed that design 300 may achieve optimal power boost gains for all dRUs/dMRUs and that each dRU/dMRU may have a repeatable pattern. It is noteworthy that $RU_{start}(r)$ for dRU26 may also be calculated as mod(0:13:36*13−1,36). Also, for simplicity in notation, $RU_{start}(r)$ for dRU26 may be with logical RU index r=1, 2, ..., 36. In case that r=19 is considered the "reserved" or "not defined" index, then $RU_{start}(r)$={0, 13, 26, 3, 16, 29, 6, 19, 32, 9, 22, 35, 12, 25, 2, 15, 28, 5, NA, 18, 31, 8, 21, 34, 11, 24, 1, 14, 27, 4, 17, 30, 7, 20, 33, 10, 23} by inserting some value like "NA" or "−1" or others to reserve that position. This may be applied to other tables in various designs in accordance with the present disclosure. The tone distribution patterns of dRU52, dRU106 and dRU242 with $N_p=36$ on BW80 are shown in parts (A), (B) and (C) of FIG. 3B, respectively.

Under the proposed scheme, the formula and parameters described above may be utilized to define the fundamental rules and methods for generation of dRU subcarrier indices. Based on the proposed design rules and parameters, there may be several alternative ways to represent the dRU subcarrier indices. In a first alternative way, $dRU(r,k)=\Omega(K_{td}(r,k))$, where $\Omega$ denotes the tone mapping range which may be predefined. For instance, $\Omega=[-120:-2, 2:120]$ or $[-121:-2, 2:121]$ or $[-122:-2, 2:122]$ for dRU on BW20; $\Omega=[-244:-3, 3:244]$ or $[-243:-3, 3:243]$ or others for dRU on BW40; $\Omega=[-500: -3, 3:500]$ or $[-499:-3, 3:499]$ or others for dRU on BW80. Moreover, $K_{td}(r,k)$ may be calculated by using formula and parameters described above, with r being the dRU index and k being the dRU natural subcarrier orders, k=0, 1, ..., $N_{st}-1$.

In a second alternative way, $K_{td}=K_{td}+N_{guard,left}$, with $N_{guard,left}=6$ for BW20 and $N_{guard,left}=12$ for BW40, BW80 and BW160, $N_{guard,left}$ denotes the number of guard tones on the left side of the tone distribution pattern. Moreover:

$$\text{If } k_{td} > \frac{N_{fft}}{2} - \left\lceil \frac{N_{DC}}{2} \right\rceil, k_{td} = k_t + N_{DC}$$

Here, $N_{DC}=3$ for BW20 and $N_{DC}=5$ for BW40, BW80 and BW160, and $N_{DC}$ denotes the number of DC tones. Then, $K_{td}=K_{td}-(N_{fft}/2+1)$ to map the positive integer numbers to the frequency-domain tone index.

In a third alternative way, similar to regular RU, the dRU subcarrier indices may be generated and represented as shown in FIG. 4A~FIG. 7B.

Under the proposed scheme, with respect to the dMRU of 78-tone dMRU(26+52) and 132-tone dMRU(26+106), the distribution tone indices for dMRU78 may include corresponding dRU26 and dRU52 distribution subcarrier indices, and the distribution tone indices for dMRU132 may include corresponding dRU26 and dRU106 distribution subcarrier indices.

FIG. 4A and FIG. 4B each illustrates a respective portion of an example design 400 under Option 1 in accordance with the present disclosure. More specifically, subcarrier indices in the table shown in FIG. 4A and FIG. 4B may be generated with a tone distribution pattern that is edge-aligned and DC-symmetric, with $N_p=36$, for dRUs of different sizes in an 80 MHz extremely-high-throughput (EHT) trigger-based (TB) physical-layer protocol data unit (PPDU) for 6 GHz LPI.

FIG. 5A and FIG. 5B each illustrates a respective portion of an example design 500 under Option 1 in accordance with the present disclosure. More specifically, subcarrier indices in the table shown in FIG. 5A and FIG. 5B may be generated with a tone distribution pattern that is edge-aligned but DC-asymmetric, with $N_p=36$, for dRUs of different sizes in an 80 MHz EHT TB PPDU for 6 GHz LPI.

FIG. 6A and FIG. 6B each illustrates a respective portion of an example design 600 under Option 1 in accordance with the present disclosure. More specifically, subcarrier indices in the table shown in FIG. 6A and FIG. 6B may be generated with a tone distribution pattern that is center-aligned and DC-symmetric, with $N_p=36$, for dRUs of different sizes in an 80 MHz EHT TB PPDU for 6 GHz LPI.

FIG. 7A and FIG. 7B each illustrates a respective portion of an example design 700 under Option 1 in accordance with the present disclosure. More specifically, subcarrier indices in the table shown in FIG. 7A and FIG. 7B may be generated with a tone distribution pattern that is center-aligned but DC-asymmetric, with $N_p=36$, for dRUs of different sizes in an 80 MHz EHT TB PPDU for 6 GHz LPI.

Figure 8B:
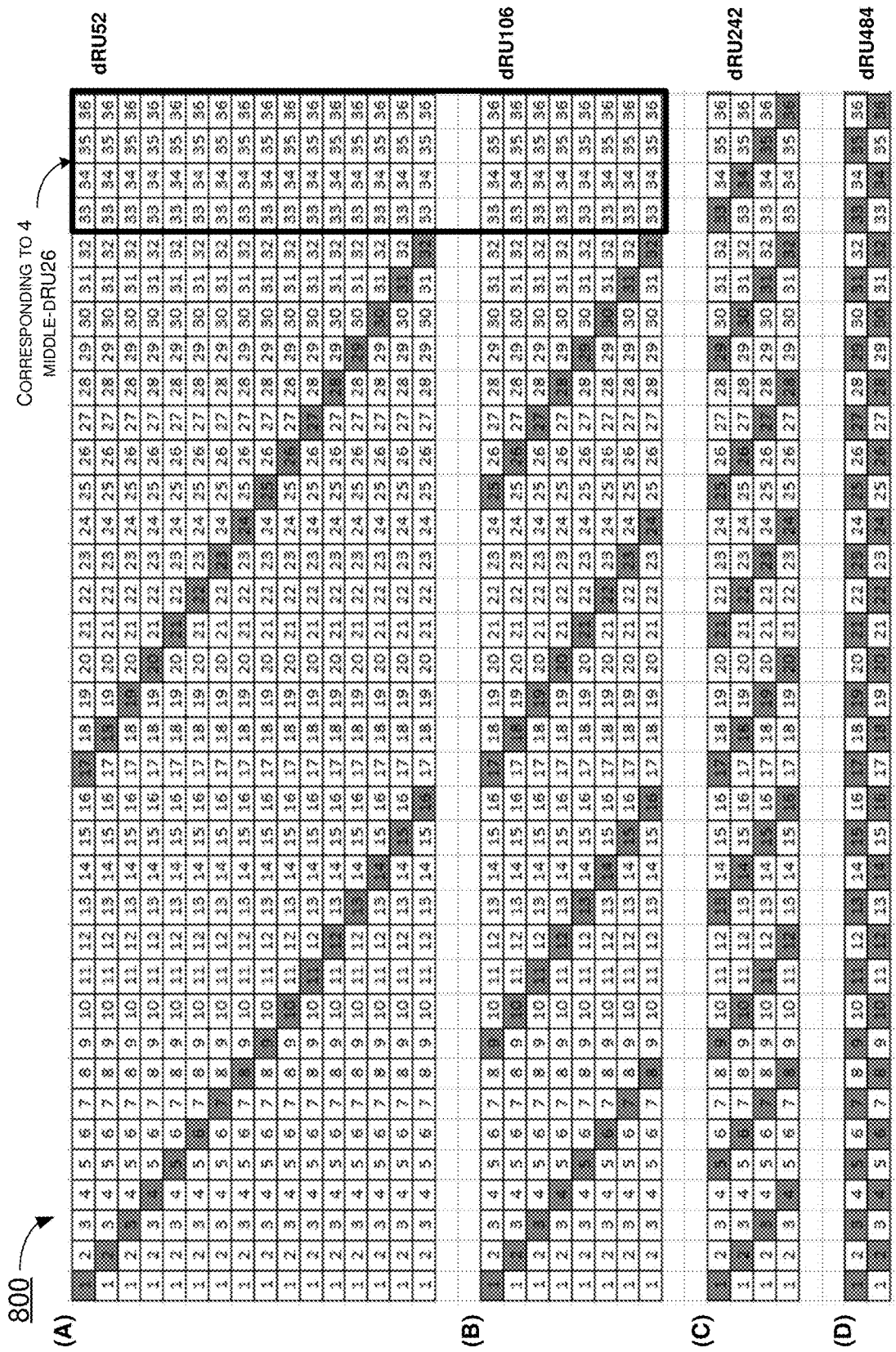

FIG. 8A and FIG. 8B each illustrates a respective portion of an example design 800 under a proposed scheme (Option 2) in accordance with the present disclosure. FIG. 8A shows a table listing the parameters $RU_{start}(r)$ and $l_{(i)}$ for dRUs of different sizes (e.g., dRU26, dRU52, dRU106, dRU242 and dRU484) with $N_p=36$ on BW80 under design 800. It is believed that design 800 may achieve optimal power boost gains for all dRUs/dMRUs (except for dMRU132), that each dRU/dMRU may have a repeatable pattern, and that dRU242 and dRU484 may be uniformly distributed. Part (A) of FIG. 8A shows one aspect of design 800 that may be implemented when dRU484 is supported, with V=[0, 16, 8, 24, 32, 4, 20, 12, 28, 6, 22, 14, 30, 34, 2, 18, 10, 26]. Part (B) of FIG. 8A shows one aspect of design 800 that may be implemented when dRU484 is not supported, with V=[0, 16, 8, 24, 32, 4, 20, 12, 28, 1, 17, 9, 25, 33, 5, 21, 13, 29]. The tone distribution patterns of dRU52, dRU106, dRU242 and dRU484 with $N_p=36$ on BW80 are shown in parts (A), (B), (C) and (D) of FIG. 8B, respectively. In the tone distribution patterns of dRU52 and dRU106, the four right-most columns may correspond to the subcarrier indices of four middle dRU26. It is noteworthy that the same procedures described above with respect to Option 1 may be followed to generate the dRU subcarrier indices table for the tone distribution pattern under Option 2.

Figure 9B:
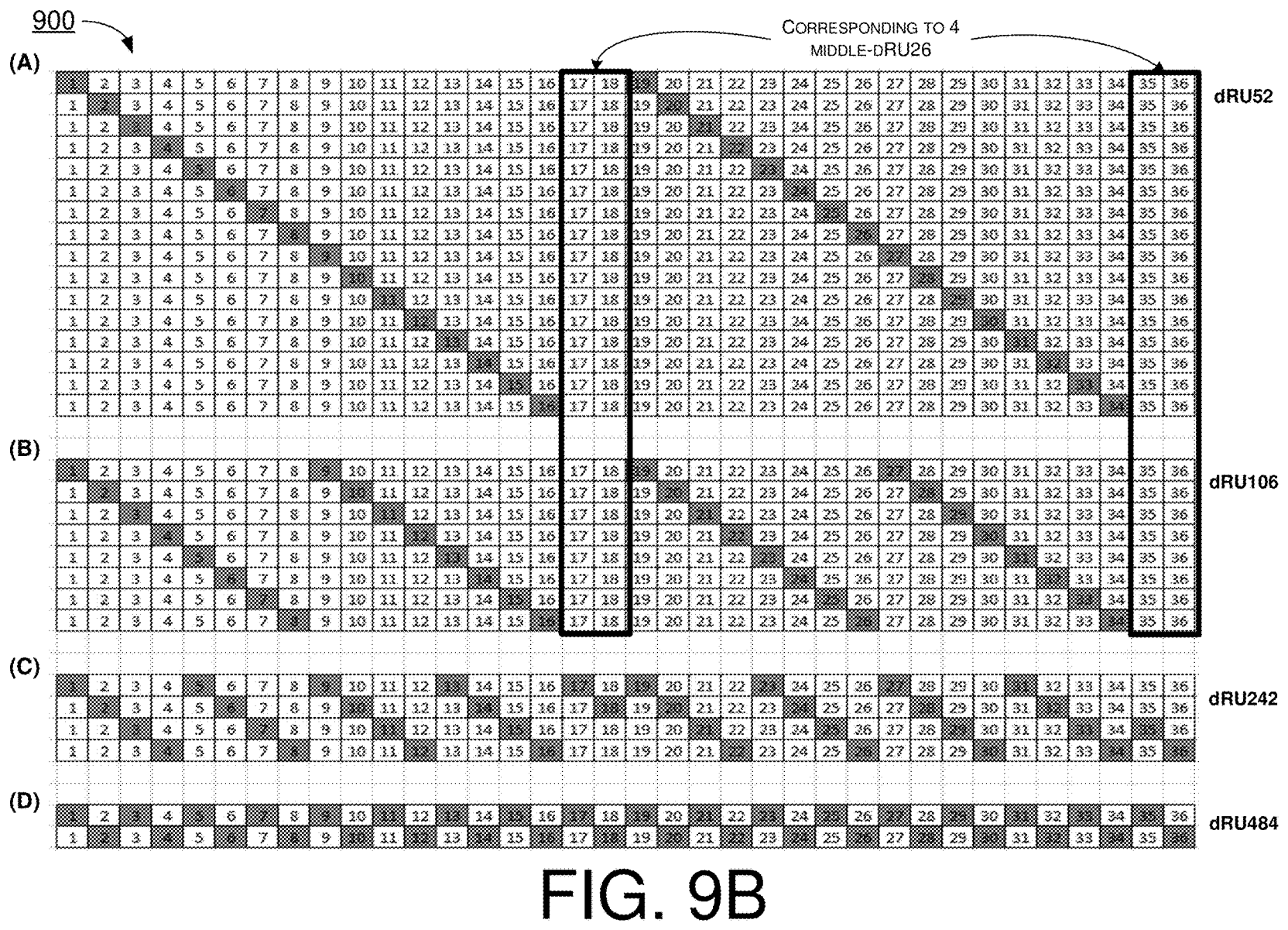

FIG. 9A and FIG. 9B each illustrates a respective portion of an example design 900 under a proposed scheme (Option 3) in accordance with the present disclosure. FIG. 9A shows a table listing the parameters $RU_{start}(r)$ and $l_{(i)}$ for dRUs of different sizes (e.g., dRU26, dRU52, dRU106, dRU242 and dRU484) with $N_p=36$ on BW80 under design 900. It is believed that design 900 may achieve optimal power boost gains for all dRUs/dMRUs (except for dMRU132) and that each dRU/dMRU may have a repeatable pattern. Moreover, dRU242 may have two distribution patterns and dRU484 may have one distribution pattern. Part (A) of FIG. 9A shows one aspect of design 900 that may be implemented when dRU484 is supported, with V=[0, 18, 8, 26, 16, 4, 22, 12, 30, 2, 20, 10, 28, 34, 6, 24, 4, 32]. Part (B) of FIG. 9A shows one aspect of design 900 that may be implemented when dRU484 is not supported, with V=[0, 18, 8, 26, 16, 4, 22, 12, 30, 1, 19, 9, 27, 17, 5, 23, 13, 31]. The tone distribution patterns of dRU52, dRU106, dRU242 and dRU484 with $N_p=36$ on BW80 are shown in parts (A), (B), (C) and (D) of FIG. 9B, respectively. In the tone distribution patterns of dRU52 and dRU106, the encircled two middle columns and the two right-most columns may correspond to the subcarrier indices of four middle dRU26. It is noteworthy that the same procedures described above with respect to Option 1 may be followed to generate the dRU subcarrier indices table for the tone distribution pattern under Option 3.

Figure 10B:
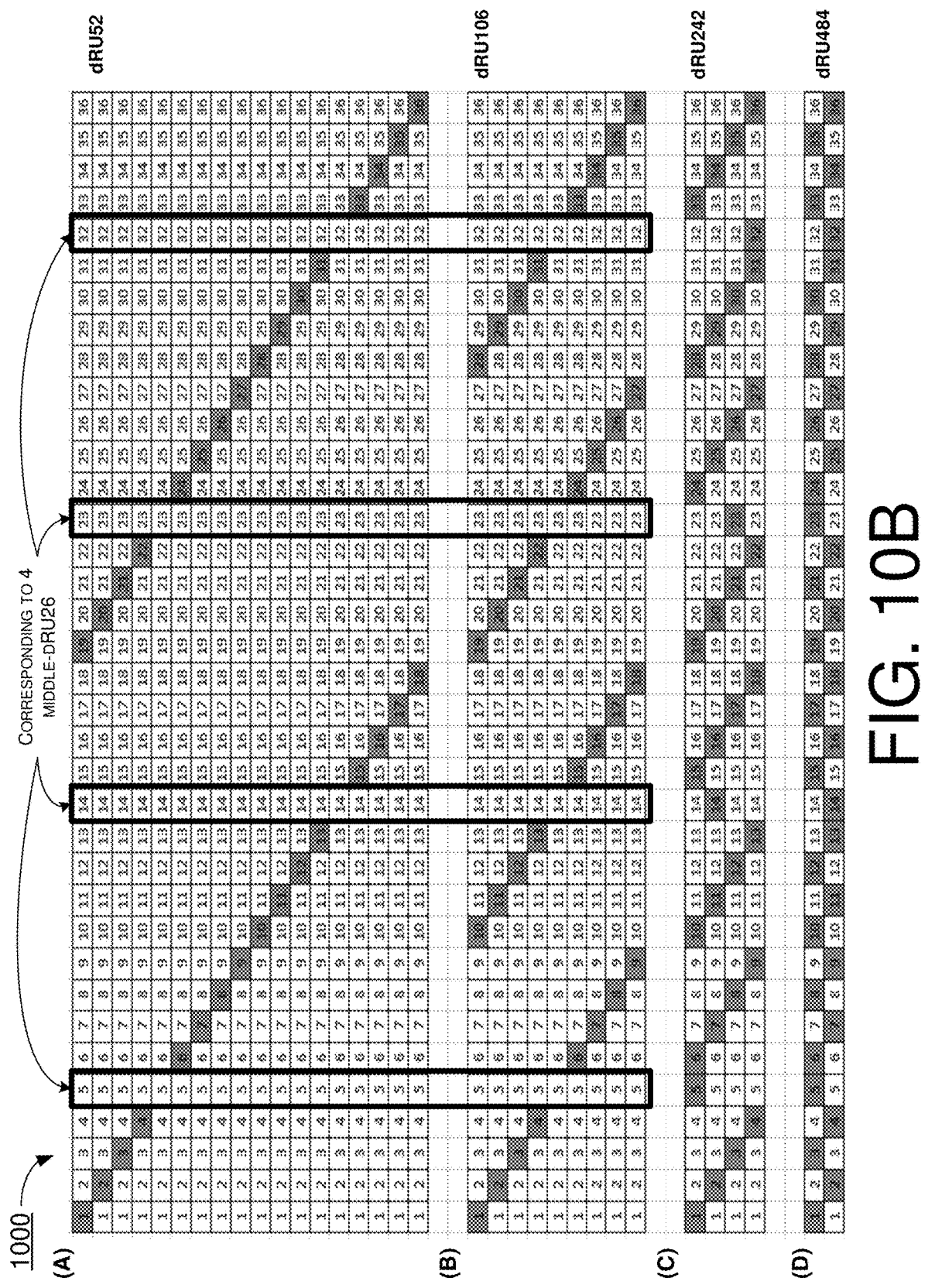

FIG. 10A and FIG. 10B each illustrates a respective portion of an example design 1000 under a proposed scheme (Option 4) in accordance with the present disclosure. FIG. 10A shows a table listing the parameters $RU_{start}(r)$ and $1_{(i)}$ for dRUs of different sizes (e.g., dRU26, dRU52, dRU106, dRU242 and dRU484) with $N_p=36$ on BW80 under design 1000. It is believed that design 1000 may achieve optimal power boost gains for all dRUs/dMRUs (except for dMRU132), that each dRU/dMRU may have a repeatable pattern, and that dRU242 and dRU484 may have different distribution patterns. Part (A) of FIG. 10A shows one aspect of design 1000 that may be implemented when dRU484 is supported, with V=[0, 18, 9, 27, 4, 5, 23, 14, 32, 2, 20, 11, 29, 22, 7, 25, 16, 34]. Part (B) of FIG. 10A shows one aspect of design 1000 that may be implemented when dRU484 is not supported, with V=[0, 18, 9, 27, 4, 5, 23, 14, 32, 1, 19, 10, 28, 21, 6, 24, 15, 33]. The tone distribution patterns of dRU52, dRU106, dRU242 and dRU484 with $N_p=36$ on BW80 are shown in parts (A), (B), (C) and (D) of FIG. 10B, respectively. In the tone distribution patterns of dRU52 and dRU106, four encircled individual columns may correspond to the subcarrier indices of four middle dRU26. It is noteworthy that the same procedures described above with respect to Option 1 may be followed to generate the dRU subcarrier indices table for the tone distribution pattern under Option 4.

Figure 11B:
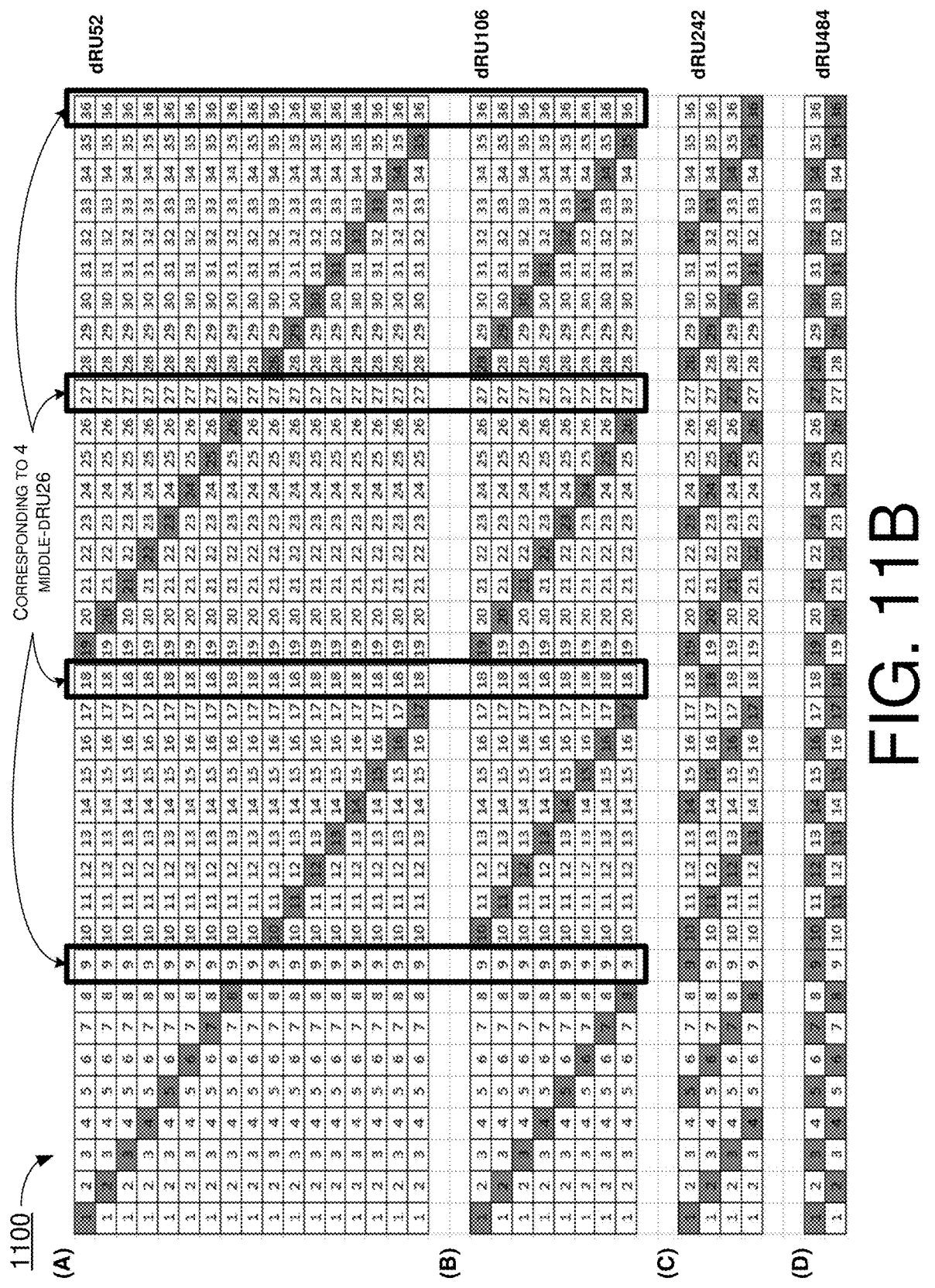

FIG. 11A and FIG. 11B each illustrates a respective portion of an example design 1100 under a proposed scheme (Option 5) in accordance with the present disclosure. FIG. 11A shows a table listing the parameters $RU_{start}(r)$ and $1_{(i)}$ for dRUs of different sizes (e.g., dRU26, dRU52, dRU106, dRU242 and dRU484) with $N_p=36$ on BW80 under design 1100. It is believed that design 1100 may achieve optimal power boost gains for all dRUs/dMRUs (except for dMRU132), that each dRU/dMRU may have a repeatable pattern, and that dRU242 and dRU484 may have different distribution patterns. Part (A) of FIG. 11A shows one aspect of design 1100 that may be implemented when dRU484 is supported, with V=[0, 18, 9, 27, 8, 4, 22, 13, 31, 2, 20, 11, 29, 26, 6, 24, 15, 33, 1, 19, 10, 28, 17, 5, 23, 14, 32, 3, 21, 12, 30, 35, 7, 25, 16, 34]. Part (B) of FIG. 11A shows one aspect of design 1100 that may be implemented when dRU484 is not supported, with V=[0, 18, 9, 27, 8, 4, 22, 13, 31, 1, 19, 10, 28, 17, 5, 23, 14, 32, 2, 20, 11, 29, 26, 6, 24, 15, 33, 3, 21, 12, 30, 35, 7, 25, 16, 34]. The tone distribution patterns of dRU52, dRU106, dRU242 and dRU484 with $N_p=36$ on BW80 are shown in parts (A), (B), (C) and (D) of FIG. 11B, respectively. In the tone distribution patterns of dRU52 and dRU106, four encircled individual columns may correspond to the subcarrier indices of four middle dRU26.

FIG. 12A and FIG. 12B each illustrates a respective portion of an example design 1200 under Option 5 in accordance with the present disclosure. More specifically, subcarrier indices in the table shown in FIG. 12A and FIG. 12B may be generated with a tone distribution pattern that is edge-aligned and DC-symmetric, with $N_p=36$, in which 52-tone and 106-tone dRUs subcarrier indices are represented in 26-tone dRU subcarrier indices based on the dRU hierarchical structure, for dRUs of different sizes in an 80 MHz EHT TB PPDU for 6 GHz LPI.

FIG. 13A and FIG. 13B each illustrates a respective portion of an example design 1300 under Option 5 in accordance with the present disclosure. More specifically, subcarrier indices in the table shown in FIG. 13A and FIG. 13B may be generated with a tone distribution pattern that is edge-aligned and DC-symmetric, with $N_p=36$, for dRUs of different sizes in an 80 MHz EHT TB PPDU for 6 GHz LPI.

Figure 14A:

FIG. 14A and FIG. 14B each illustrates a respective portion of an example design 1400 under Option 5 in accordance with the present disclosure. More specifically, subcarrier indices in the table shown in FIG. 14A and FIG. 14B may be generated with a tone distribution pattern that is edge-aligned but DC-asymmetric, with $N_p=36$, in which 52-tone and 106-tone dRUs subcarrier indices are represented in 26-tone dRU subcarrier indices based on the dRU hierarchical structure, for dRUs of different sizes in an 80 MHz EHT TB PPDU for 6 GHz LPI.

FIG. 15A and FIG. 15B each illustrates a respective portion of an example design 1500 under Option 5 in accordance with the present disclosure. More specifically, subcarrier indices in the table shown in FIG. 15A and FIG. 15B may be generated with a tone distribution pattern that is edge-aligned but DC-asymmetric, with $N_p=36$, for dRUs of different sizes in an 80 MHz EHT TB PPDU for 6 GHz LPI.

FIG. 16A and FIG. 16B each illustrates a respective portion of an example design 1600 under Option 5 in accordance with the present disclosure. More specifically, subcarrier indices in the table shown in FIG. 16A and FIG. 16B may be generated with a tone distribution pattern that is center-aligned and DC-symmetric, with $N_p=36$, in which 52-tone and 106-tone dRUs subcarrier indices are represented in 26-tone dRU subcarrier indices based on the dRU hierarchical structure, for dRUs of different sizes in an 80 MHz EHT TB PPDU for 6 GHz LPI.

FIG. 17A and FIG. 17B each illustrates a respective portion of an example design 1700 under Option 5 in accordance with the present disclosure. More specifically, subcarrier indices in the table shown in FIG. 17A and FIG. 17B may be generated with a tone distribution pattern that is center-aligned and DC-symmetric, with $N_p=36$, for dRUs of different sizes in an 80 MHz EHT TB PPDU for 6 GHz LPI.

FIG. 18A and FIG. 18B each illustrates a respective portion of an example design 1800 under Option 5 in accordance with the present disclosure. More specifically, subcarrier indices in the table shown in FIG. 18A and FIG. 18B may be generated with a tone distribution pattern that is center-aligned but DC-asymmetric, with $N_p=36$, in which 52-tone and 106-tone dRUs subcarrier indices are represented in 26-tone dRU subcarrier indices based on the dRU hierarchical structure, for dRUs of different sizes in an 80 MHz EHT TB PPDU for 6 GHz LPI.

FIG. 19A and FIG. 19B each illustrates a respective portion of an example design 1900 under Option 5 in accordance with the present disclosure. More specifically, subcarrier indices in the table shown in FIG. 19A and FIG. 19B may be generated with a tone distribution pattern that is edge-aligned but DC-asymmetric, with $N_p=36$, for dRUs of different sizes in an 80 MHz EHT TB PPDU for 6 GHz LPI.

Figure 20B:
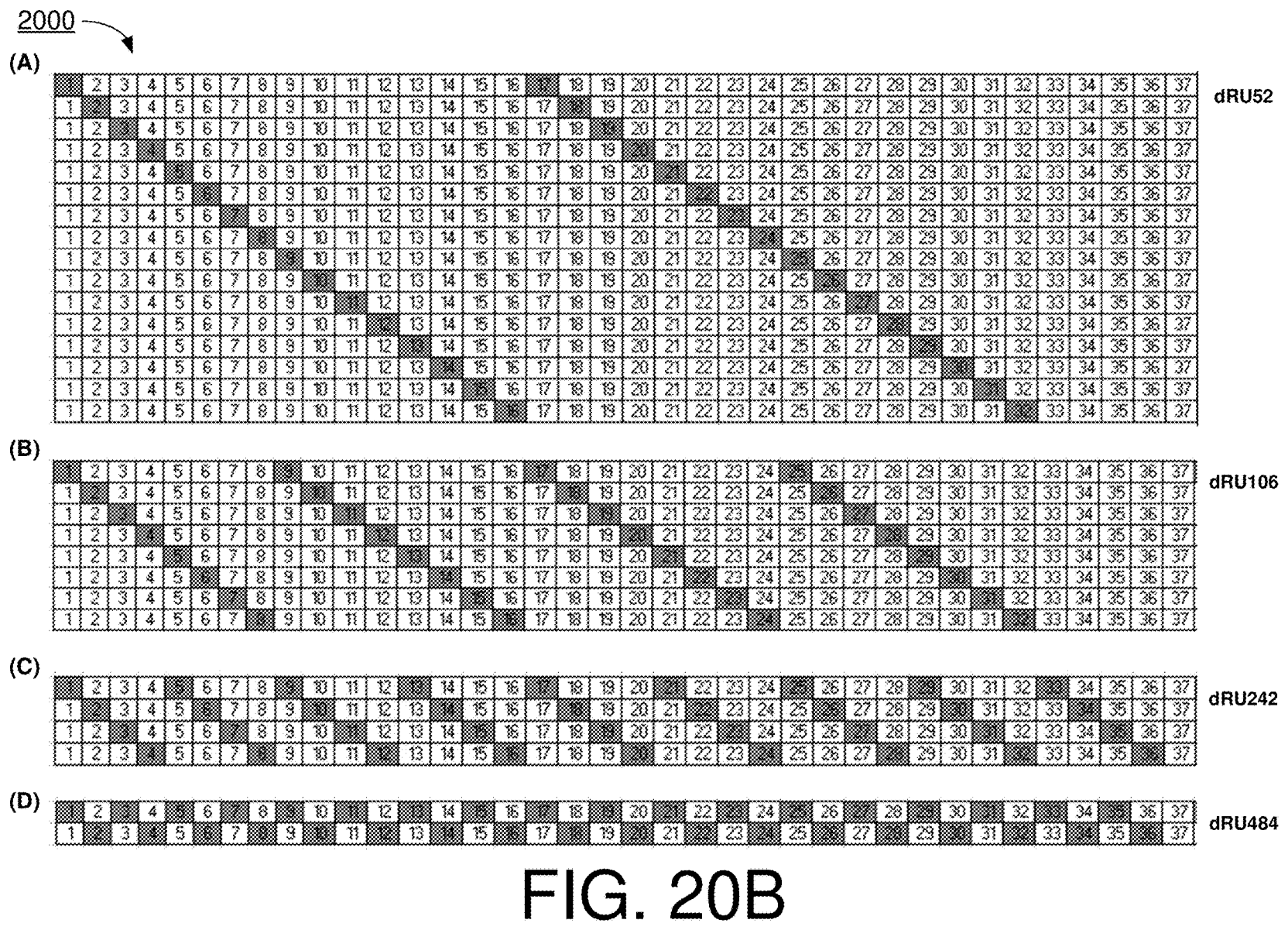

FIG. 20A and FIG. 20B each illustrates a respective portion of an example design 2000 under a proposed scheme in accordance with the present disclosure. FIG. 20A shows a table listing the parameters $RU_{start}(r)$ and $1_{(i)}$ for dRUs of different sizes (e.g., dRU26, dRU52, dRU106, dRU242 and dRU484) with $N_p=37$ and V=[0, 16, 8, 24, 32, 4, 20, 12, 28, 6, 22, 14, 30, 34, 2, 18, 10, 26] on BW80 under design 2000.

It is believed that design 2000 may achieve optimal power boost gains for all dRUs/dMRUs and that each dRU/dMRU may have a repeatable pattern. Moreover, same-size dRU (e.g., dRU26/52/106/242/484) may have the same tone distribution pattern. The tone distribution patterns of dRU52, dRU106, dRU242 and dRU484 with $N_p=37$ on BW80 are shown in parts (A), (B), (C) and (D) of FIG. 20B, respectively.

FIG. 21A and FIG. 21B each illustrates a respective portion of an example design 2100 under the proposed scheme described above with respect to design 2000. More specifically, subcarrier indices in the table shown in FIG. 21A and FIG. 21B may be generated with a tone distribution pattern that is edge-aligned and DC-symmetric, with $N_p=37$, for dRUs of different sizes in an 80 MHz EHT TBPPDU for 6 GHz LPI.

FIG. 22A and FIG. 22B each illustrates a respective portion of an example design 2200 under the proposed scheme described above with respect to design 2000. More specifically, subcarrier indices in the table shown in FIG. 22A and FIG. 22B may be generated with a tone distribution pattern that is center-aligned and DC-symmetric, with $N_p=37$, for dRUs of different sizes in an 80 MHz EHT TBPPDU for 6 GHz LPI.

Under certain proposed schemes in accordance with the present disclosure, for BW80, the dRU subcarrier indices table may be generated for dRU/dMRU over an orthogonal frequency-division multiple-access (OFDMA) tone plan based on the optimized dRU designs described above. For BW40, the dRU subcarrier indices table may be updated. For BW20, the dRU subcarrier indices table may be updated and, additionally, alternative dRU design parameters may be utilized, and the dRU subcarrier indices tables may be generated according to proposed schemes described below. It is noteworthy that, in the dRU subcarrier indices tables, four 26-tone dRUs may be equivalent to two 52-tone dRUs (e.g., 26-tone dRU1 dRU4 may be deemed to be the same as 52-tone dRU1~ dRU2, 26-tone dRU6 dRU9 may be deemed to be the same as 52-tone dRU3~ dRU4, and so on. Thus, the dRU subcarrier indices for 106-tone dRUs may be represented either in four 26-tone dRUs or two 52-tone dRUs with two extra tones.

Figure 23:
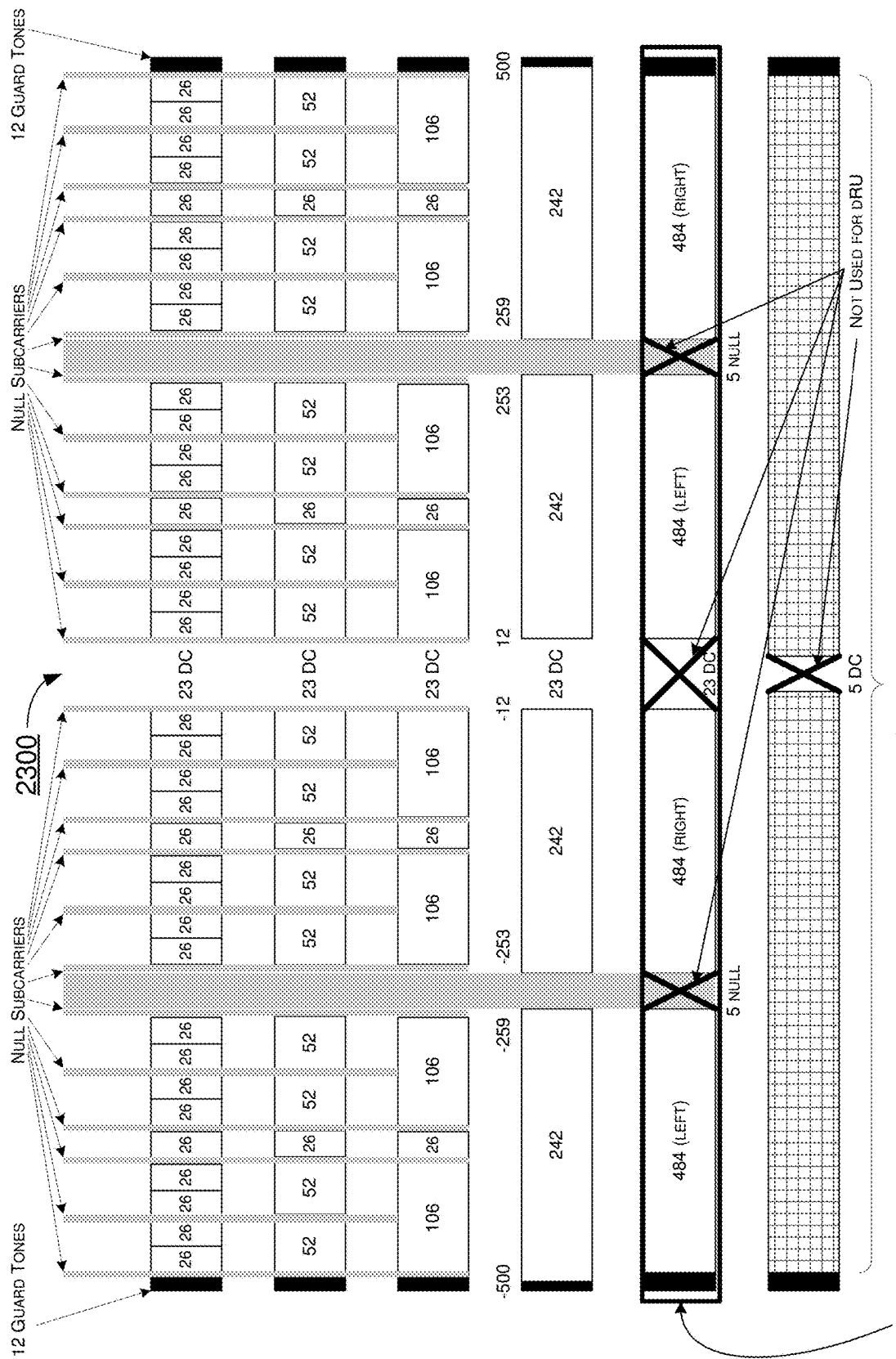
FIG. 23 is a diagram of an example design under a proposed scheme in accordance with an implementation of the present disclosure.

FIG. 23 illustrates an example design 2300 under a proposed scheme in accordance with the present disclosure. For BW80 in IEEE 802.11be, the tone distribution range for an OFDMA tone plan range may be [−500:−259, −253:−12, 12:253, 259:500], and [−258:−254, −11:11, 254:258] may be considered as null subcarriers or DC tones. Additionally, the tone distribution range for a non-OFDMA tone plan or 996-tone RU tone plan for BW80 in IEEE 802.11be may be [−500:−3, 3:500], and five tones of [−2:2] may be used for DC tones. As mentioned above, dRU subcarrier indices tables for BW80 may be generated for dRU distributed over a non-OFDMA tone plan. Under the proposed schemes described below, the optimal dRU designs (Options 1~5) with $N_p=36$ may distribute tones over either an OFDMA tone plan or non-OFDMA tone plan, and dRU subcarrier indices table may be generated accordingly.

FIG. 24A, FIG. 24B and FIG. 24C each illustrates a diagram of a respective portion of an example design 2400 under a proposed scheme in accordance with an implementation of the present disclosure. More specifically, subcarrier indices in the table shown in FIG. 24A, FIG. 24B and FIG. 24C may be generated with an OFDMA tone distribution pattern that is edge-aligned and DC-symmetric, with $N_p=36$, for dRUs of different sizes in an 80 MHz EHT TBPPDU for 6 GHz LPI.

FIG. 25A, FIG. 25B and FIG. 25C each illustrates a diagram of a respective portion of an example design 2500 under a proposed scheme in accordance with an implementation of the present disclosure. More specifically, subcarrier indices in the table shown in FIG. 25A, FIG. 25B and FIG. 25C may be generated with an OFDMA tone distribution pattern that is center-aligned and DC-symmetric, with $N_p=36$, for dRUs of different sizes in an 80 MHz EHT TBPPDU for 6 GHz LPI.

Figure 26:
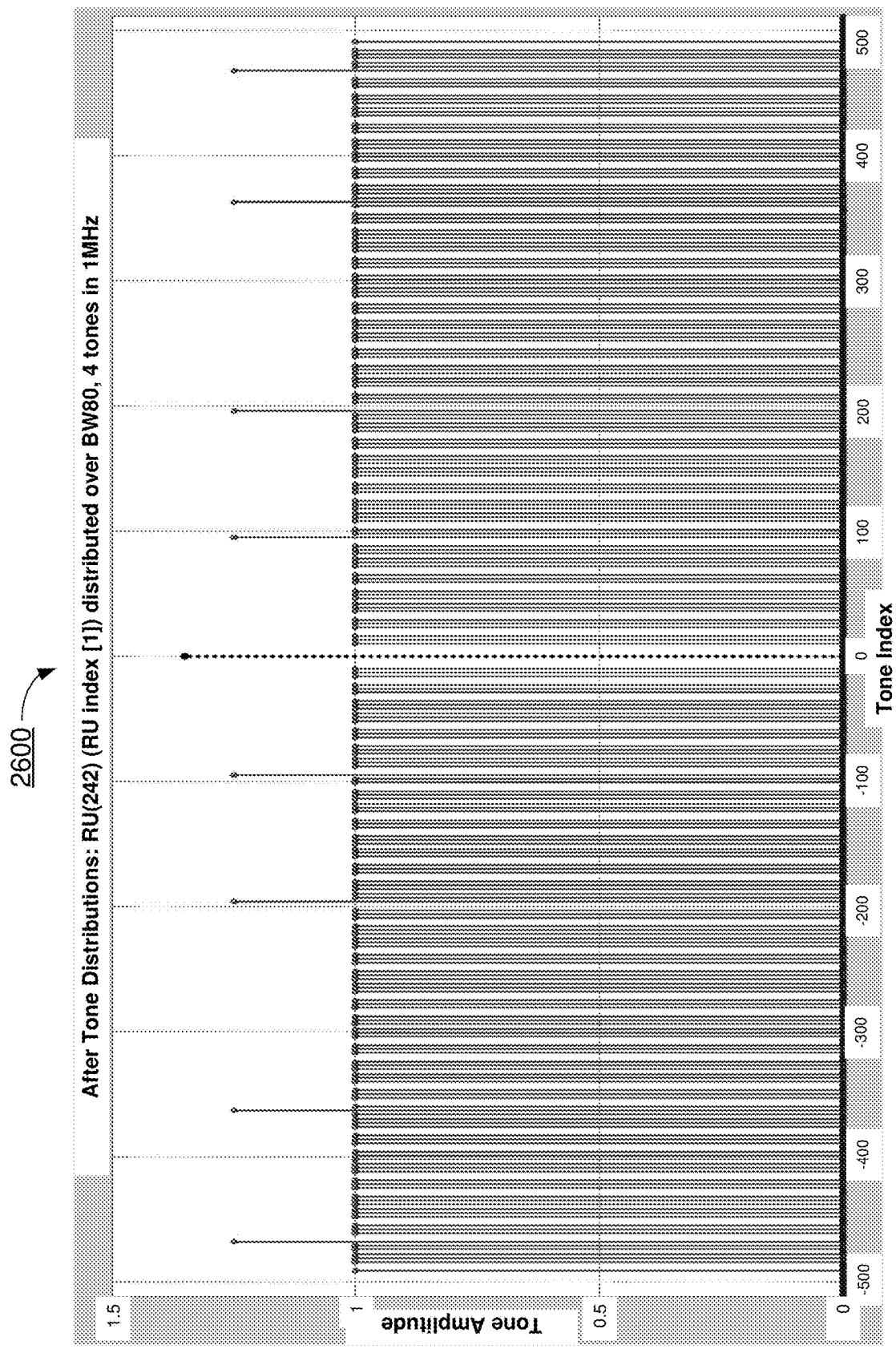
FIG. 26 is a diagram of an example scenario under a proposed scheme in accordance with an implementation of the present disclosure.

FIG. 26 illustrates an example scenario 2600 under a proposed scheme in accordance with an implementation of the present disclosure. More specifically, scenario 2600 shows tone distribution of dRU242 on BW80 with a non-OFDMA tone plan that is center-aligned and DC-symmetric, with $N_p=36$.

Figure 27:
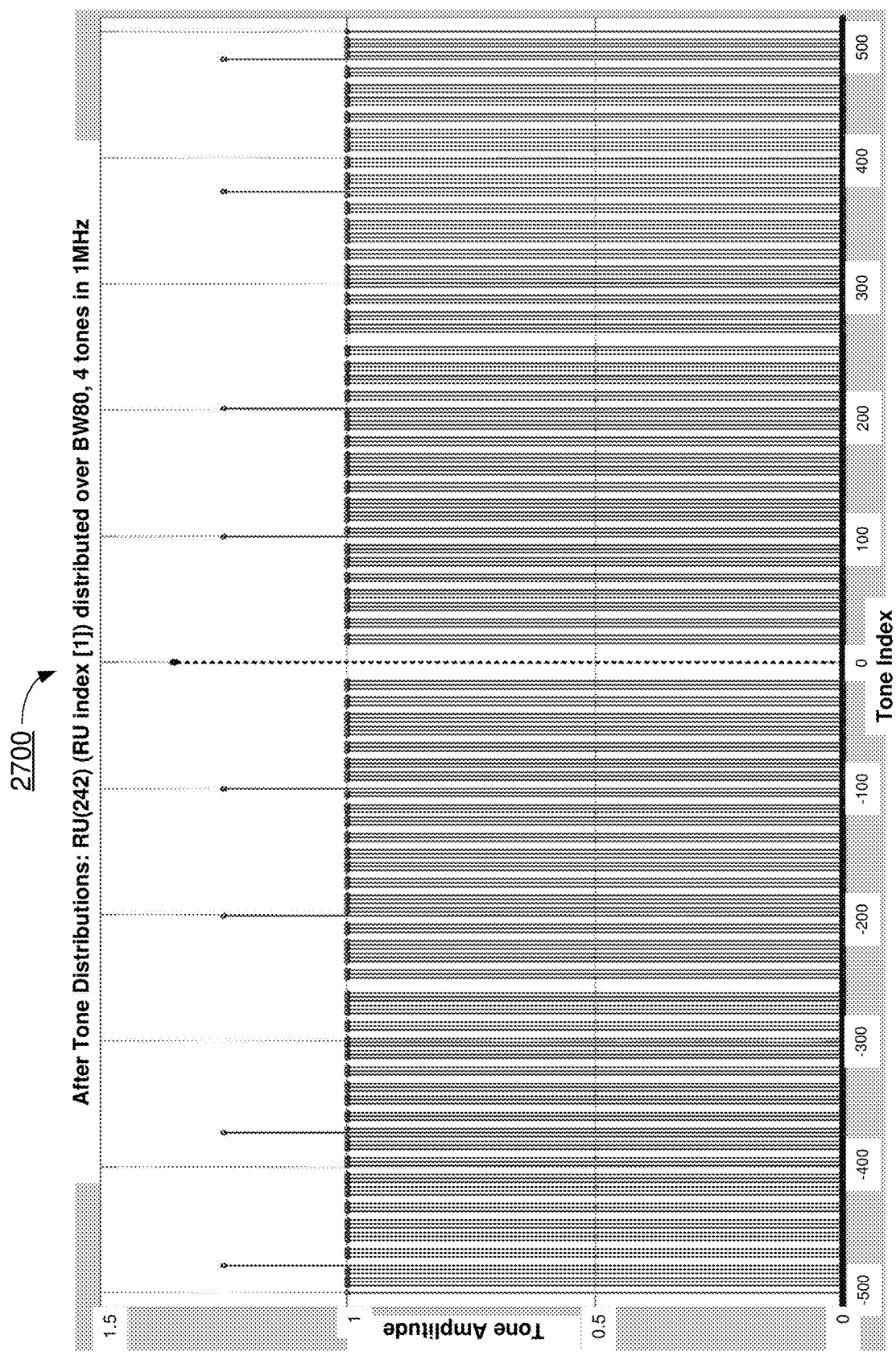
FIG. 27 is a diagram of an example scenario under a proposed scheme in accordance with an implementation of the present disclosure.

FIG. 27 illustrates an example scenario 2700 under a proposed scheme in accordance with an implementation of the present disclosure. More specifically, scenario 2700 shows a tone distribution of dRU242 on BW80 with an OFDMA tone plan that is center-aligned and DC-symmetric, with $N_p=36$.

FIG. 28A and FIG. 28B each illustrates a diagram of a respective portion of an example design 2800 under a proposed scheme in accordance with an implementation of the present disclosure. In particular, FIG. 28A illustrates an updated dRU data and pilot subcarrier indices table for BW40 with a tone distribution pattern that is center-aligned and DC-symmetric. Moreover, FIG. 28B illustrates another updated dRU data and pilot subcarrier indices table for BW40 with a tone distribution pattern that is center-aligned and DC-symmetric.

FIG. 29A, FIG. 29B and FIG. 29C each illustrates a diagram of a respective portion of an example design 2900 under a proposed scheme in accordance with an implementation of the present disclosure. In particular, FIG. 29A illustrates an updated dRU data and pilot subcarrier indices table for BW20 with a tone distribution pattern that is center-aligned and DC-symmetric, and more DC tones (e.g., seven DC tones) are reserved. Moreover, FIG. 29B illustrates another updated dRU data and pilot subcarrier indices table for BW20 with a tone distribution pattern that is center-aligned and DC-symmetric, and more DC tones (e.g., five DC tones) are reserved. Furthermore, FIG. 29C illustrates another updated dRU data and pilot subcarrier indices table for BW20 with a tone distribution pattern that is edge-aligned and DC-symmetric with a first left tone=−121 and five DC tones.

Figure 30B:
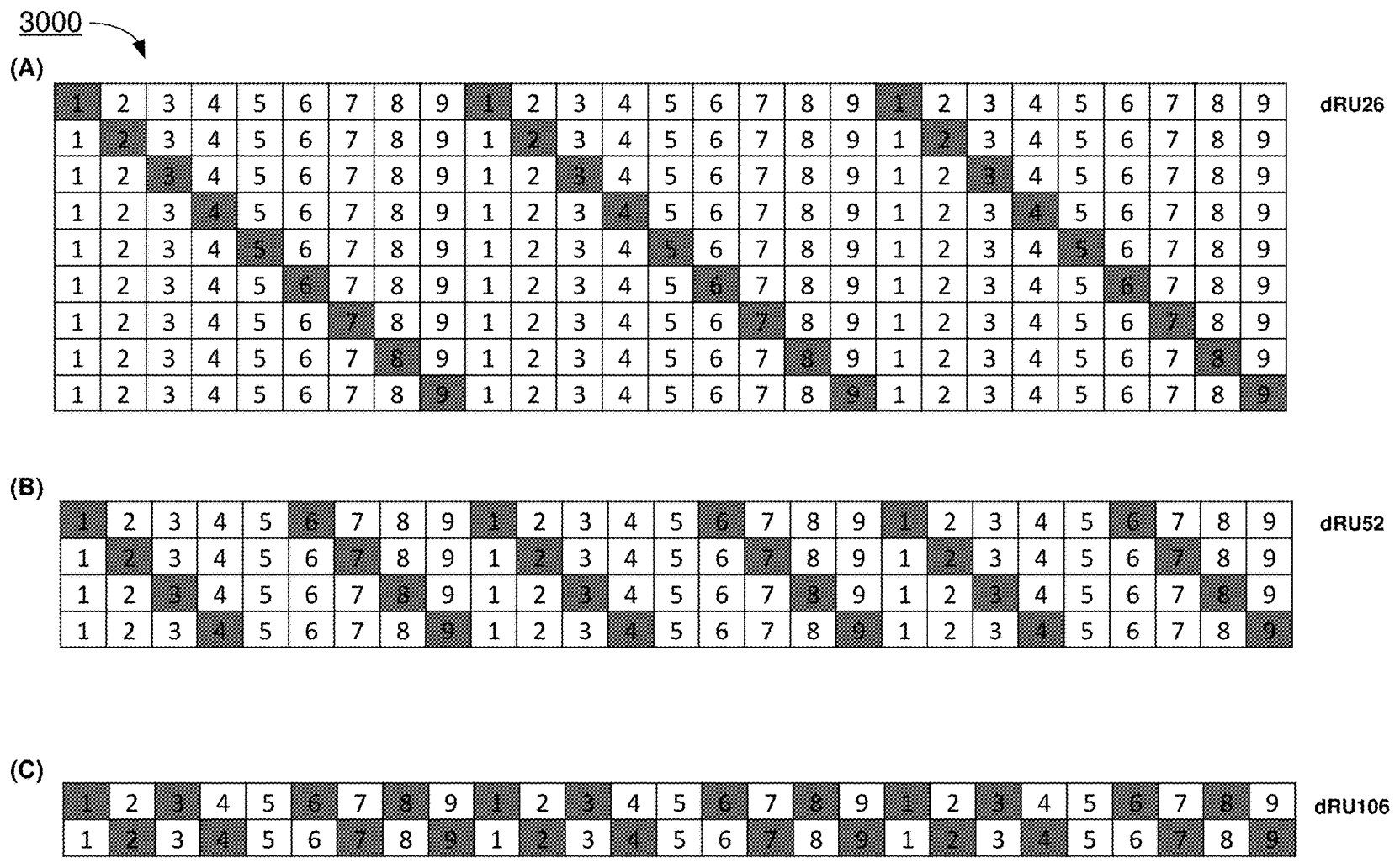

FIG. 30A and FIG. 30B each illustrates a respective portion of an example design 3000 under a proposed scheme in accordance with the present disclosure. FIG. 30A shows a table listing the parameters $RU_{start}(r)$ and $1_{(i)}$ for dRUs of different sizes (e.g., dRU26, dRU52 and dRU106) with $N_p=9$ on BW20 under design 3000. The tone distribution patterns of dRU26, dRU52 and dRU106 on BW20 are shown in parts (A), (B) and (C) of FIG. 30B, respectively.

FIG. 31A, FIG. 31B and FIG. 31C each illustrates a diagram of a respective portion of an example design 3100 under a proposed scheme in accordance with an implementation of the present disclosure. In particular, FIG. 31A illustrates an updated dRU data and pilot subcarrier indices table for BW20 with a tone distribution pattern that is edge-aligned and DC-symmetric with a first left tone=−120 and three DC tones. Moreover, FIG. 31B illustrates another updated dRU data and pilot subcarrier indices table for BW20 with a tone distribution pattern that is edge-aligned and DC-symmetric with a first left tone=−121 and five DC tones. Furthermore, FIG. 31C illustrates another updated dRU data and pilot subcarrier indices table for BW20 with a tone distribution pattern that is edge-aligned and DC-symmetric with a first left tone=−122 and seven DC tones.

FIG. 32A, FIG. 32B and FIG. 32C each illustrates a diagram of a respective portion of an example design 3200 under a proposed scheme in accordance with an implementation of the present disclosure. In particular, FIG. 32A illustrates an updated dRU data and pilot subcarrier indices table for BW20 with a tone distribution pattern that is center-aligned and DC-symmetric with three DC tones. Moreover, FIG. 32B illustrates another updated dRU data and pilot subcarrier indices table for BW20 with a tone distribution pattern that is center-aligned and DC-symmetric with five DC tones. Furthermore, FIG. 32C illustrates another updated dRU data and pilot subcarrier indices table for BW20 with a tone distribution pattern that is center-aligned and DC-symmetric with seven DC tones.

FIG. 33A and FIG. 33B each illustrates a diagram of a respective portion of an example design 3300 under a proposed scheme in accordance with an implementation of the present disclosure. In particular, FIG. 33A illustrates an updated dRU data and pilot subcarrier indices table for BW20 with a tone distribution pattern that is edge-aligned and DC-symmetric with a first left tone=−120 and three DC tones. Moreover, FIG. 33B illustrates another updated dRU data and pilot subcarrier indices table for BW20 with a tone distribution pattern that is center-aligned and DC-symmetric with three DC tones.

Illustrative Implementations

Figure 34:
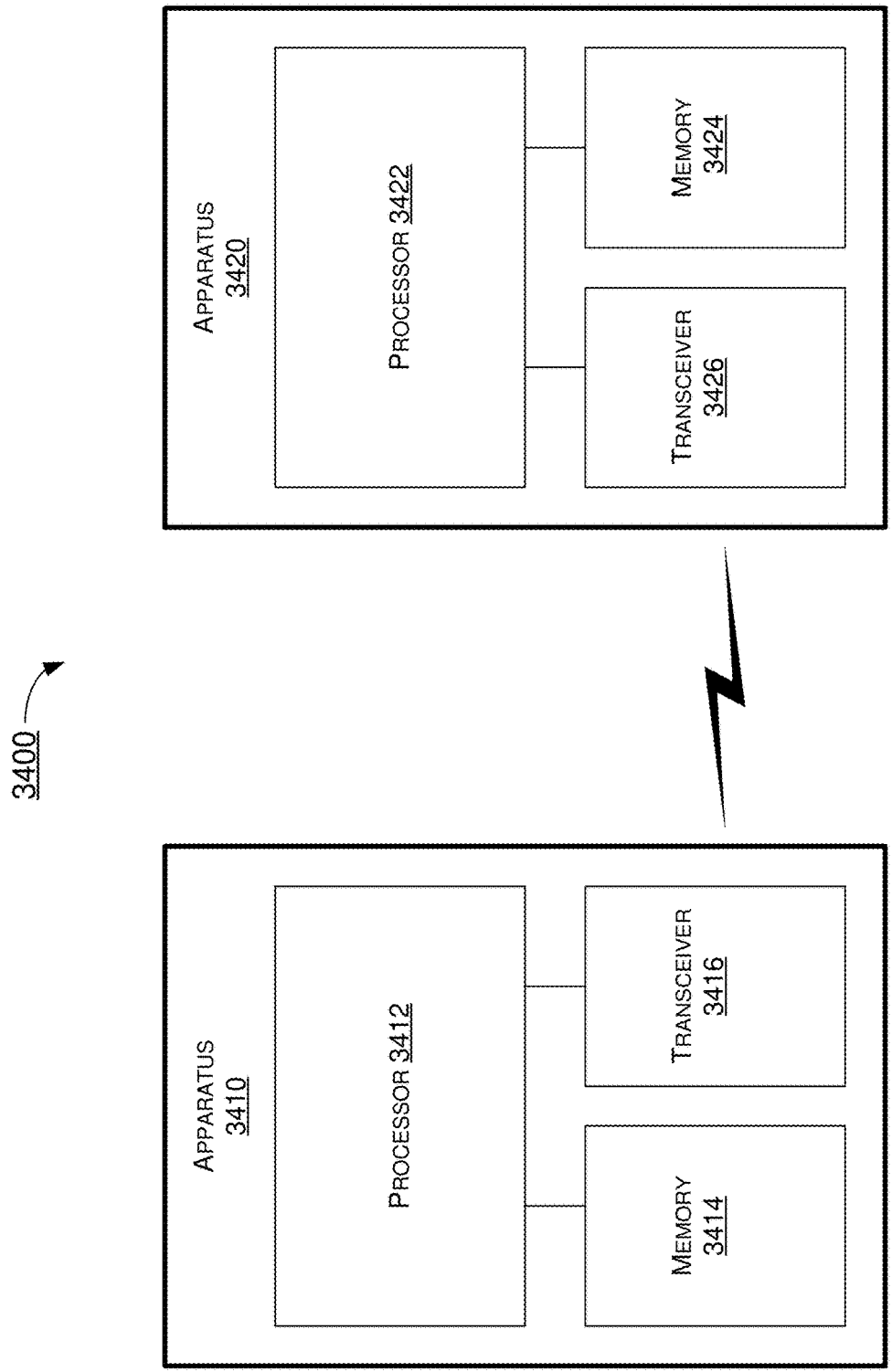
FIG. 34 is a block diagram of an example communication system in accordance with an implementation of the present disclosure.

FIG. 34 illustrates an example system 3400 having at least an example apparatus 3410 and an example apparatus 3420 in accordance with an implementation of the present disclosure. Each of apparatus 3410 and apparatus 3420 may perform various functions to implement schemes, techniques, processes and methods described herein pertaining to optimization of dRU/dMRU designs for transmission in a 6 GHz LPI system, including the various schemes described above with respect to various proposed designs, concepts, schemes, systems and method described above as well as processes described below. For instance, apparatus 3410 may be an example implementation of communication entity 110, and apparatus 3420 may be an example implementation of communication entity 120.

Each of apparatus 3410 and apparatus 3420 may be a part of an electronic apparatus, which may be a STA or an AP, such as a portable or mobile apparatus, a wearable apparatus, a wireless communication apparatus or a computing apparatus. For instance, each of apparatus 3410 and apparatus 3420 may be implemented in a smartphone, a smart watch, a personal digital assistant, a digital camera, or a computing equipment such as a tablet computer, a laptop computer or a notebook computer. Each of apparatus 3410 and apparatus 3420 may also be a part of a machine type apparatus, which may be an IoT apparatus such as an immobile or a stationary apparatus, a home apparatus, a wire communication apparatus or a computing apparatus. For instance, each of apparatus 3410 and apparatus 3420 may be implemented in a smart thermostat, a smart fridge, a smart door lock, a wireless speaker or a home control center. When implemented in or as a network apparatus, apparatus 3410 and/or apparatus 3420 may be implemented in a network node, such as an AP in a WLAN.

In some implementations, each of apparatus 3410 and apparatus 3420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3410 and apparatus 3420 may be implemented in or as a STA or an AP. Each of apparatus 3410 and apparatus 3420 may include at least some of those components shown in FIG. 34 such as a processor 3412 and a processor 3422, respectively, for example. Each of apparatus 3410 and apparatus 3420 may further include one or more other components not pertinent to the proposed scheme of the present disclosure (e.g., internal power supply, display device and/or user interface device), and, thus, such component(s) of apparatus 3410 and apparatus 3420 are neither shown in FIG. 34 nor described below in the interest of simplicity and brevity.

In one aspect, each of processor 3412 and processor 3422 may be implemented in the form of one or more single-core processors, one or more multi-core processors, one or more RISC processors or one or more CISC processors. That is, even though a singular term "a processor" is used herein to refer to processor 3412 and processor 3422, each of processor 3412 and processor 3422 may include multiple processors in some implementations and a single processor in other implementations in accordance with the present disclosure. In another aspect, each of processor 3412 and processor 3422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3412 and processor 3422 is a special-purpose machine specifically designed, arranged and configured to perform specific tasks including those pertaining to optimization of dRU/dMRU designs for transmission in a 6 GHz LPI system in accordance with various implementations of the present disclosure. For instance, each of processor 3412 and processor 3422 may be configured with hardware components, or circuitry, implementing one, some or all of the examples described and illustrated herein.

In some implementations, apparatus 3410 may also include a transceiver 3416 coupled to processor 3412. Transceiver 3416 may be capable of wirelessly transmitting and receiving data. In some implementations, apparatus 3420 may also include a transceiver 3426 coupled to processor 3422. Transceiver 3426 may include a transceiver capable of wirelessly transmitting and receiving data.

In some implementations, apparatus 3410 may further include a memory 3414 coupled to processor 3412 and capable of being accessed by processor 3412 and storing data therein. In some implementations, apparatus 3420 may further include a memory 3424 coupled to processor 3422 and capable of being accessed by processor 3422 and storing data therein. Each of memory 3414 and memory 3424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3414 and memory 3424 may include a type of read-only memory (ROM) such as mask ROM, programmable ROM (PROM), erasable programmable ROM (EPROM) and/or electrically erasable programmable ROM (EEPROM). Alternatively, or additionally, each of memory 3414 and memory 3424 may include a type of non-volatile random-access memory (NVRAM) such as flash memory, solid-state memory, ferroelectric RAM (FeRAM), magnetoresistive RAM (MRAM) and/or phase-change memory.

Each of apparatus 3410 and apparatus 3420 may be a communication entity capable of communicating with each other using various proposed schemes in accordance with the present disclosure. For illustrative purposes and without limitation, a description of capabilities of apparatus 3410, as communication entity 110, and apparatus 3420, as communication entity 120, is provided below. It is noteworthy that, although the example implementations described below are provided in the context of WLAN, the same may be implemented in other types of networks. Thus, although the following description of example implementations pertains to a scenario in which apparatus 3410 functions as a transmitting device and apparatus 3420 functions as a receiving device, the same is also applicable to another scenario in which apparatus 3410 functions as a receiving device and apparatus 3420 functions as a transmitting device.

Under a proposed scheme in accordance with the present disclosure with respect to optimization of dRU/dMRU designs for transmission in a 6 GHz LPI system, processor 3412 of apparatus 3410 may distribute a plurality of subcarriers of a RU to generate a dRU or a dMRU on an 80 MHz frequency segment or subblock. Moreover, processor 3412 may communicate, via transceiver 3416, with a communication entity (e.g., apparatus 3420) using the dRU or the dMRU.

In some implementations, a repetition period of a plurality of tones of the dRU or the dMRU may be 36. In such a case, the plurality of tones of the dRU or the dMRU may be distributed over ether an OFDMA tone plan or a non-OFDMA tone plan. Alternatively, the repetition period of the plurality of tones of the dRU or the dMRU may be 37. In such a case, the plurality of tones of the dRU or the dMRU may be distributed over a non-OFDMA tone plan.

In some implementations, the dRU or the dMRU may be generated based on a subcarrier indices table with parameters $RU_{start}(r)$ and $1_{(i)}$. In such a case, $RU_{start}(r)$ may denote a first or starting tone index for the dRU or the dMRU; $1_{(i)}$ may denote one or more tones of the dRU or the dMRU within one repetition distance or one repetition period; r may denote a dRU index; $i=mod(k, L)=0, 1, 2, \ldots, L-1$; $k=0, 1, \ldots, N_{st}-1$; L may denote a number of tones of the dRU or the dMRU within one repetition distance or one repetition period; and $N_{st}$ may denote a number of subcarriers associated with the dRU or the dMRU.

In some implementations, a 484-tone dRU may be supported in the subcarrier indices table. In some implementations, the dRU may include a 26-tone dRU with the $RU_{start}(r)=\{V, V+1\}$ and the $1_{(i)}=\{0\}$, with $V=[0, 16, 8, 24, 32, 4, 20, 12, 28, 6, 22, 14, 30, 34, 2, 18, 10, 26]$. Alternatively, the dRU may include a 52-tone dRU with the $RU_{start}(r)=\{0, 8, 4, 12, 6, 14, 2, 10, 1, 9, 5, 13, 7, 15, 3, 11\}$ and the $1_{(i)}=\{0, 16\}$. Alternatively, the dRU may include a 106-tone dRU with the $RU_{start}(r)=\{0, 4, 6, 2, 1, 5, 7, 3\}$ and the $1_{(i)}=\{0, 8, 16, 24\}$. Alternatively, the dRU may include a 242-tone dRU with the $RU_{start}(r)=\{0, 2, 1, 3\}$ and the $1_{(i)}=\{0:4:32\}$. Alternatively, the dRU may include a 484-tone dRU with the $RU_{start}(r)=\{0, 1\}$ and the $1_{(i)}=\{0:2:34\}$.

In some implementations, the dRU may include a 26-tone dRU with the $RU_{start}(r)=\{0, 13, 26, 3, 16, 29, 6, 19, 32, 9, 22, 35, 12, 25, 2, 15, 28, 5, 18, 31, 8, 21, 34, 11, 24, 1, 14, 27, 4, 17, 30, 7, 20, 33, 10, 23\}$ and the $1_{(i)}=\{0\}$. Alternatively, the dRU may include a 52-tone dRU with the $RU_{start}(r)=\{0, 3, 6, 19, 9, 12, 2, 5, 18, 8, 11, 1, 4, 17, 20, 10\}$ and the $1_{(i)}=\{0, 13\}$ for dRU1, dRU4, dRU5, dRU7, dRU9, dRU10, dRU11, dRU12, dRU14, dRU15 and dRU16 or $1_{(i)}=\{0, 23\}$ for dRU2, dRU3, dRU6, dRU8 and dRU13. Alternatively, the dRU may include a 106-tone dRU with the $RU_{start}(r)=\{0, 6, 9, 2, 8, 1, 4, 10\}$ and the $1_{(i)}=\{0, 3, 13, 26\}$ for dRU1, dRU3 and dRU4, $1_{(i)}=\{0, 13, 23, 26\}$ for dRU2 and dRU7, or $1_{(i)}=\{0, 10, 13, 23\}$ for dRU5, dRU6 and dRU8. Alternatively, the dRU may include a 242-tone dRU with the $RU_{start}(r)=\{0, 2, 1, 4\}$ and the $1_{(i)}=\{0, 3, 6, 13, 16, 19, 26, 29, 32\}$ for dRU1, $1_{(i)}=\{0, 3, 7, 10, 13, 20, 23, 26, 33\}$ for dRU2, $1_{(i)}=\{0, 7, 10, 13, 17, 20, 23, 30, 33\}$ for dRU3, or $1_{(i)}=\{0, 3, 6, 13, 16, 19, 23, 26, 29\}$ for dRU4. Still alternatively, the dRU may include a 484-tone dRU with the $RU_{start}(r)=\{0, 1\}$ and the $1_{(i)}=\{0, 2, 3, 5, 6, 9, 12, 13, 15, 16, 19, 22, 25, 26, 28, 29, 32, 35\}$ for dRU1, or $1_{(i)}=\{0, 3, 6, 7, 9, 10, 13, 16, 17, 19, 20, 22, 23, 26, 29, 30, 32, 33\}$ for dRU2.

In some implementations, a tone distribution pattern of the dRU or the dMRU may be center-aligned and DC-symmetric. Alternatively, the tone distribution pattern of the dRU or the dMRU may be center-aligned and DC-asymmetric. Alternatively, the tone distribution pattern of the dRU or the dMRU may be edge-aligned and DC-symmetric. Still alternatively, the tone distribution pattern of the dRU or the dMRU may be edge-aligned and DC-asymmetric.

Illustrative Processes

FIG. 35 illustrates an example process 3500 in accordance with an implementation of the present disclosure. Process 3500 may represent an aspect of implementing various proposed designs, concepts, schemes, systems and methods described above. More specifically, process 3500 may represent an aspect of the proposed concepts and schemes pertaining to optimization of dRU/dMRU designs for transmission in a 6 GHz LPI system in accordance with the present disclosure. Process 3500 may include one or more operations, actions, or functions as illustrated by one or more of blocks 3510 and 3520. Although illustrated as discrete blocks, various blocks of process 3500 may be divided into additional blocks, combined into fewer blocks, or eliminated, depending on the desired implementation. Moreover, the blocks/sub-blocks of process 3500 may be executed in the order shown in FIG. 35 or, alternatively in a different order. Furthermore, one or more of the blocks/sub-blocks of process 3500 may be executed repeatedly or iteratively. Process 3500 may be implemented by or in apparatus 3410 and apparatus 3420 as well as any variations thereof. Solely for illustrative purposes and without limiting the scope, process 3500 is described below in the context of apparatus 3410 as communication entity 110 (e.g., a transmitting device whether a STA or an AP) and apparatus 3420 as communication entity 120 (e.g., a receiving device whether a STA or an AP) of a wireless network such as a WLAN in accordance with one or more of IEEE 802.11 standards. Process 3500 may begin at block 3510.

At 3510, process 3500 may involve processor 3412 of apparatus 3410 distributing a plurality of subcarriers of a RU to generate a dRU or a dMRU on an 80 MHz frequency segment or subblock. Process 3500 may proceed from 3510 to 3520.

At 3520, process 3500 may involve processor 3412 communicating, via transceiver 3416, with a communication entity (e.g., apparatus 3420) using the dRU or the dMRU.

In some implementations, a repetition period of a plurality of tones of the dRU or the dMRU may be 36. In such a case, the plurality of tones of the dRU or the dMRU may be distributed over ether an OFDMA tone plan or a non-OFDMA tone plan. Alternatively, the repetition period of the plurality of tones of the dRU or the dMRU may be 37. In such a case, the plurality of tones of the dRU or the dMRU may be distributed over a non-OFDMA tone plan.

In some implementations, the dRU or the dMRU may be generated based on a subcarrier indices table with parameters $RU_{start}(r)$ and $1_{(i)}$. In such a case, $RU_{start}(r)$ may denote a first or starting tone index for the dRU or the dMRU; $1_{(i)}$ may denote one or more tones of the dRU or the dMRU within one repetition distance or one repetition period; r may denote a dRU index; $i=\text{mod}(k, L)=0, 1, 2, \ldots, L-1$; $k=0, 1, \ldots, N_{st}-1$; L may denote a number of tones of the dRU or the dMRU within one repetition distance or one repetition period; and $N_{st}$ may denote a number of subcarriers associated with the dRU or the dMRU.

In some implementations, a 484-tone dRU may be supported in the subcarrier indices table. In some implementations, the dRU may include a 26-tone dRU with the $RU_{start}(r)=\{V, V+1\}$ and the $1_{(i)}=\{0\}$, with $V=[0, 16, 8, 24, 32, 4, 20, 12, 28, 6, 22, 14, 30, 34, 2, 18, 10, 26]$. Alternatively, the dRU may include a 52-tone dRU with the $RU_{start}(r)=\{0, 8, 4, 12, 6, 14, 2, 10, 1, 9, 5, 13, 7, 15, 3, 11\}$ and the $1_{(i)}=\{0, 16\}$. Alternatively, the dRU may include a 106-tone dRU with the $RU_{start}(r)=\{0, 4, 6, 2, 1, 5, 7, 3\}$ and the $1_{(i)}\{0, 8, 16, 24\}$. Alternatively, the dRU may include a 242-tone dRU with the $RU_{start}(r)=\{0, 2, 1, 3\}$ and the $1_{(i)}=\{0:4:32\}$. Alternatively, the dRU may include a 484-tone dRU with the $RU_{start}(r)=\{0, 1\}$ and the $1_{(i)}=\{0:2:34\}$.

In some implementations, the dRU may include a 26-tone dRU with the $RU_{start}(r)=\{0, 13, 26, 3, 16, 29, 6, 19, 32, 9, 22, 35, 12, 25, 2, 15, 28, 5, 18, 31, 8, 21, 34, 11, 24, 1, 14, 27, 4, 17, 30, 7, 20, 33, 10, 23\}$ and the $1_{(i)}=\{0\}$. Alternatively, the dRU may include a 52-tone dRU with the $RU_{start}(r)=\{0, 3, 6, 19, 9, 12, 2, 5, 18, 8, 11, 1, 4, 17, 20, 10\}$ and the $1_{(i)}=\{0, 13\}$ for dRU1, dRU4, dRU5, dRU7, dRU9, dRU10, dRU11, dRU12, dRU14, dRU15 and dRU16 or $1_{(i)}=\{0, 23\}$ for dRU2, dRU3, dRU6, dRU8 and dRU13. Alternatively, the dRU may include a 106-tone dRU with the $RU_{start}(r)=\{0, 6, 9, 2, 8, 1, 4, 10\}$ and the $1_{(i)}=\{0, 3, 13, 26\}$ for dRU1, dRU3 and dRU4, $1_{(i)}=\{0, 13, 23, 26\}$ for dRU2 and dRU7, or $1_{(i)}=\{0, 10, 13, 23\}$ for dRU5, dRU6 and dRU8. Alternatively, the dRU may include a 242-tone dRU with the $RU_{start}(r)=\{0, 2, 1, 4\}$ and the $1_{(i)}=\{0, 3, 6, 13, 16, 19, 26, 29, 32\}$ for dRU1, $1_{(i)}=\{0, 3, 7, 10, 13, 20, 23, 26, 33\}$ for dRU2, $1_{(i)}=\{0, 7, 10, 13, 17, 20, 23, 30, 33\}$ for dRU3, or $1_{(i)}=\{0, 3, 6, 13, 16, 19, 23, 26, 29\}$ for dRU4. Still alternatively, the dRU may include a 484-tone dRU with the $RU_{start}(r)=\{0, 1\}$ and the $1_{(i)}=\{0, 2, 3, 5, 6, 9, 12, 13, 15, 16, 19, 22, 25, 26, 28, 29, 32, 35\}$ for dRU1, or $1_{(i)}=\{0, 3, 6, 7, 9, 10, 13, 16, 17, 19, 20, 22, 23, 26, 29, 30, 32, 33\}$ for dRU2.

In some implementations, a tone distribution pattern of the dRU or the dMRU may be center-aligned and DC-symmetric. Alternatively, the tone distribution pattern of the dRU or the dMRU may be center-aligned and DC-asymmetric. Alternatively, the tone distribution pattern of the dRU or the dMRU may be edge-aligned and DC-symmetric. Still alternatively, the tone distribution pattern of the dRU or the dMRU may be edge-aligned and DC-asymmetric.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   distributing a plurality of subcarriers of a resource unit (RU) to generate a distributed-tone RU (dRU) or a distributed-tone multi-RU (dMRU) on an 80 MHz frequency segment or subblock; and
   communicating with a communication entity using the dRU or the dMRU,
   wherein the dRU or the dMRU is generated based on a subcarrier indices table with parameters $RU_{start}(r)$ and $I_{(i)}$, and
   wherein:
      $RU_{start}(r)$ denotes a first or starting tone index for the dRU or the dMRU,
      $I_{(i)}$ denotes one or more tones of the dRU or the dMRU within one repetition distance or one repetition period,
      r denotes a dRU index,
      i=mod(k, L)=0, 1, 2, . . . , L−1,
      k=0, 1, . . . , $N_{st}$−1,
      L denotes a number of tones of the dRU or the dMRU within one repetition distance or one repetition period, and
      $N_{st}$ denotes a number of subcarriers associated with the dRU or the dMRU.

2. The method of claim 1, wherein a repetition period of a plurality of tones of the dRU or the dMRU is 36, and wherein the plurality of tones of the dRU or the dMRU are distributed over either an orthogonal frequency-division multiple-access (OFDMA) tone plan or a non-OFDMA tone plan.

3. The method of claim 1, wherein a repetition period of a plurality of tones of the dRU is 37, and wherein the plurality of tones of the dRU or the dMRU are distributed over a non-orthogonal frequency-division multiple-access (non-OFDMA) tone plan.

4. The method of claim 1, wherein a 484-tone dRU is supported in the subcarrier indices table.

5. The method of claim 4, wherein the dRU comprises a 26-tone dRU with the $RU_{start}(r)=\{V, V+1\}$ and the $I_{(i)}=\{0\}$, and wherein V=[0, 16, 8, 24, 32, 4, 20, 12, 28, 6, 22, 14, 30, 34, 2, 18, 10, 26].

6. The method of claim 4, wherein the dRU comprises a 52-tone dRU with the $RU_{start}(r)=\{0, 8, 4, 12, 6, 14, 2, 10, 1, 9, 5, 13, 7, 15, 3, 11\}$ and the $I_{(i)}=\{0, 16\}$.

7. The method of claim 4, wherein the dRU comprises a 106-tone dRU with the $RU_{start}(r)=\{0, 4, 6, 2, 1, 5, 7, 3\}$ and the $I_{(i)}=\{0, 8, 16, 24\}$.

8. The method of claim 4, wherein the dRU comprises a 242-tone dRU with the $RU_{start}(r)=\{0, 2, 1, 3\}$ and the $I_{(i)}=\{0:4:32\}$.

9. The method of claim 4, wherein the dRU comprises a 484-tone dRU with the $RU_{start}(r)=\{0, 1\}$ and the $I_{(i)}=\{0:2:34\}$.

10. The method of claim 1, wherein the dRU comprises a 26-tone dRU with the $RU_{start}(r)=\{0, 13, 26, 3, 16, 29, 6, 19, 32, 9, 22, 35, 12, 25, 2, 15, 28, 5, 18, 31, 8, 21, 34, 11, 24, 1, 14, 27, 4, 17, 30, 7, 20, 33, 10, 23\}$ and the $I_{(i)}=\{0\}$.

11. The method of claim 1, wherein the dRU comprises a 52-tone dRU with the $RU_{start}(r)=\{0, 3, 6, 19, 9, 12, 2, 5, 18, 8, 11, 1, 4, 17, 20, 10\}$ and the $I_{(i)}=$
   $\{0, 13\}$ for dRU1, dRU4, dRU5, dRU7, dRU9, dRU10, dRU11, dRU12, dRU14, dRU15 and dRU16, or
   $\{0, 23\}$ for dRU2, dRU3, dRU6, dRU8 and dRU13.

12. The method of claim 1, wherein the dRU comprises a 106-tone dRU with the $RU_{start}(r)=\{0, 6, 9, 2, 8, 1, 4, 10\}$ and the $I_{(i)}=$
   $\{0, 3, 13, 26\}$ for dRU1, dRU3 and dRU4,
   $\{0, 13, 23, 26\}$ for dRU2 and dRU7, or
   $\{0, 10, 13, 23\}$ for dRU5, dRU6 and dRU8.

13. The method of claim 1, wherein the dRU comprises a 242-tone dRU with the $RU_{start}(r)=\{0, 2, 1, 4\}$ and the $I_{(i)}=$
   $\{0, 3, 6, 13, 16, 19, 26, 29, 32\}$ for dRU1,
   $\{0, 3, 7, 10, 13, 20, 23, 26, 33\}$ for dRU2,
   $\{0, 7, 10, 13, 17, 20, 23, 30, 33\}$ for dRU3, or
   $\{0, 3, 6, 13, 16, 19, 23, 26, 29\}$ for dRU4.

14. The method of claim 1, wherein the dRU comprises a 484-tone dRU with the $RU_{start}(r)=\{0, 1\}$ and the $I_{(i)}=$
   $\{0, 2, 3, 5, 6, 9, 12, 13, 15, 16, 19, 22, 25, 26, 28, 29, 32, 35\}$ for dRU1, or
   $\{0, 3, 6, 7, 9, 10, 13, 16, 17, 19, 20, 22, 23, 26, 29, 30, 32, 33\}$ for dRU2.

15. The method of claim 1, wherein a tone distribution pattern of the dRU or the dMRU is center-aligned and DC-symmetric.

16. The method of claim 1, wherein a tone distribution pattern of the dRU or the dMRU is center-aligned and DC-asymmetric.

17. The method of claim 1, wherein a tone distribution pattern of the dRU or the dMRU is edge-aligned and DC-symmetric.

18. The method of claim 1, wherein a tone distribution pattern of the dRU or the dMRU is edge-aligned and DC-asymmetric.

19. An apparatus, comprising:
   a transceiver configured to communicate wirelessly; and
   a processor coupled to the transceiver and configured to perform operations comprising:
      distributing a plurality of subcarriers of a resource unit (RU) to generate a distributed-tone RU (dRU) or a distributed-tone multi-RU (dMRU) on an 80 MHz frequency segment or subblock; and
      communicating, via the transceiver, with a communication entity using the dRU or the dMRU,
   wherein the dRU or the dMRU is generated based on a subcarrier indices table with parameters $RU_{start}(r)$ and $I_{(i)}$, and
   wherein:
      $RU_{start}(r)$ denotes a first or starting tone index for the dRU or the dMRU,
      $I_{(i)}$ denotes one or more tones of the dRU or the dMRU within one repetition distance or one repetition period,
      r denotes a dRU index,
      i=mod (k, L)=0, 1, 2, . . . , L−1, k=0, 1, . . . , $N_{st}-1$, L denotes a number of tones of the dRU or the dMRU within one repetition distance or one repetition period, and $N_{st}$ denotes a number of subcarriers associated with the dRU or the dMRU.

\* \* \* \* \*